United States Patent [19]
Jensen

[11] Patent Number: 5,954,169
[45] Date of Patent: Sep. 21, 1999

[54] ADAPTIVE TUNED VIBRATION ABSORBER, SYSTEM UTILIZING SAME AND METHOD OF CONTROLLING VIBRATION THEREWITH

[75] Inventor: William S. Jensen, Apex, N.C.

[73] Assignee: Lord Corporation, Cary, N.C.

[21] Appl. No.: 08/957,718

[22] Filed: Oct. 24, 1997

[51] Int. Cl.$^6$ ............................... B64D 27/00; F16F 7/10
[52] U.S. Cl. ................. 188/378; 248/550; 267/136; 267/140.15; 244/54; 244/17.27; 244/1 N; 244/129.1; 415/119; 381/71.1; 188/380
[58] Field of Search ....................... 244/54, 17.27, 244/129.1, 1 N, 17.11; 188/378, 379, 380; 381/71.1, 71.2, 71.4; 180/300, 312; 248/559, 550, 636, 562, 638; 415/119; 267/136, 140.15, 140.14; 702/195; 416/500; 364/528.15; 52/167.1, 167.3

[56] References Cited

U.S. PATENT DOCUMENTS

| | | | |
|---|---|---|---|
| 3,085,657 | 4/1963 | Preis | 188/1 |
| 3,430,902 | 3/1969 | Lohr | 248/18 |
| 3,487,888 | 1/1970 | Adams et al. | 181/33 |
| 3,566,993 | 3/1971 | Leatherwood et al. | 188/1 |
| 3,767,181 | 10/1973 | Van der Burgt et al. | 267/136 |
| 4,715,559 | 12/1987 | Fuller | 244/1 N |
| 4,935,651 | 6/1990 | Hong et al. | 310/51 |
| 5,072,801 | 12/1991 | Freymann et al. | 180/68.5 |
| 5,197,692 | 3/1993 | Jones et al. | 244/54 |
| 5,236,186 | 8/1993 | Weltin et al. | 267/140.15 |
| 5,251,863 | 10/1993 | Gossman et al. | 248/550 |
| 5,427,347 | 6/1995 | Swanson et al. | 248/550 |
| 5,551,650 | 9/1996 | Southward et al. | 244/54 |
| 5,564,537 | 10/1996 | Shonreshi | 188/380 |
| 5,695,027 | 12/1997 | von Flotow et al. | 188/380 |
| 5,713,438 | 2/1998 | Rossetti et al. | 188/378 |
| 5,754,662 | 5/1998 | Jolly et al. | 381/71.4 |
| 5,762,295 | 6/1998 | McGuire et al. | 244/54 |
| 5,802,184 | 9/1998 | Heath | 381/71.1 |
| 5,845,236 | 12/1998 | Jolly et al. | 267/136 |

FOREIGN PATENT DOCUMENTS

WO 96/12121  4/1996  WIPO.

OTHER PUBLICATIONS

Mianzo, An Adaptive Vibration Absorber To Minimize Steady State And Transient Vibration—An Analytical and Experimental Study, Aug. 1992, Master's Thesis, pp. 1–72.

Walsh et al, A Variable Stiffness Vibration Absorber For Minimization of Transient Vibrations, Academic Press Limited, 1991, pp. 195–210.

Ryan et al, Adoptive–Passive Vibration Control of Single Frequency Excitations Applied to Noise Control, May 1–4, 1994, pp. 461–466.

von Flotow et al., Adptv Tuned Vibration Absorbers: Tuning Laws, Tracking Agility, Sizing, and Physical Implementations, May 1–4, 1994, pp. 1–18.

Harmonic Drive Technologies Pancake Component Gear Sets Brochure for Part HDF20.

*Primary Examiner*—Douglas C. Butler
*Attorney, Agent, or Firm*—Randall S. Wayland

[57] ABSTRACT

A flex-plate tuned vibration absorber (35) including a tuned mass (43) flexibly suspended by one or more flex plates (58). In one aspect the tunable vibration absorber (TVA) (35) is adaptive in that the position of the mass is adaptively moveable with respect to its initial position, thereby effectuating a change in the TVA's resonant frequency. In one embodiment, the tuned mass (43) moves along a rigid frame (53). In another, movement of the mass (43) statically stresses a preferably disc-shaped flexible plate (58) thereby changing its stiffness. Preferably, a reducer (78) gears down the speed of the motor (64). In another aspect, a TVA system includes a base sensor (40) providing a base vibration signal, a mass sensor (38) for providing a vibration signal of the tuned mass (43), and an electronic controller (42) for generating a control signal to the TVA (35). The TVA finds application for absorbing vibration in vibrating structures, such as in aircraft.

40 Claims, 16 Drawing Sheets

ADAPTIVE TUNED VIBRATION ABSORBER, SYSTEM UTILIZING SAME AND METHOD OF CONTROLLING VIBRATION THEREWITH

FIELD OF THE INVENTION

The invention relates to apparatus, systems, and methods for controlling mechanical vibration in a structure. Specifically, it relates to adaptive tuned vibration absorbers, systems using them, and methods of controlling vibration therewith.

BACKGROUND OF THE INVENTION

Mechanical vibration may be created within an aircraft structure due to rotational unbalances in its engine(s). For example, on fuselage-mounted engines, the rotational unbalance(s) may cause vibration transmission into the pylon or other like connecting structure thereby vibrating the fuselage. If the fuselage vibration is well coupled to the acoustic space of the aircraft cabin, a predominantly tonal acoustic noise (generally characterized as a low frequency drone) may be generated. In particular, this drone is related to the rotation of the fan stage (at an N1 frequency) and/or of the compressor stage (at an N2 frequency). In aircraft with aft-fuselage-mounted engines, such as the McDonnell Douglas DC-9, any rotational unbalance of the engines may result in such low-frequency cabin noise. This is particularly noticeable in the cabin's aft-most section. Elimination or reduction of these N1 and/or N2 tones can dramatically reduce the annoyance experienced by passengers.

Within the prior art, various means are known for attenuating such noise and vibration. These include passive blankets, Active Isolation Control (AIC), Active Noise Control (ANC), Active Structural Control (ASC), passive Tuned Vibration Absorbers (TVAs), and Adaptive TVAs (ATVAs). Passive blankets are generally effective for attenuating high-frequency noise, but are generally ineffective at attenuating lower-frequency noise. Where a higher level of noise attenuation is desired, Active Isolation Control (AIC) systems may be utilized.

AIC systems include active mountings which accommodate engine loads/motions and include an actively-driven element to provide active (at the frequency of the vibration) control forces. These active forces prevent vibration transmission from, for instance, the aircraft's engines into the pylon structure. The resultant effect is a reduction of cabin noise.

AIC systems include the feedforward-type, in which reference signals provide reference signals representative of the engine(s) vibration(s). A plurality of distributed sensors, such as microphones, provide signals representative of residual noise at various cabin locations. These reference and error signals are processed by a digital controller to generate oscillatory anti-vibration drive signals to the actively-driven elements in the mounts. These anti-vibration signals are of the appropriate amplitude, phase, and frequency to control vibration transmission from the engine to the pylon, thereby minimizing, to the extent possible, unwanted interior noise. U.S. Pat. No. 5,551,650 entitled "Active Mounts for Aircraft Engines" describes one such AIC system. Disadvantages of AIC systems include space requirements for housing the active element, difficulty of accomplishing the appropriate actuation directions for vibration attenuation, and relatively high cost.

Active Noise Control (ANC) systems may be used, for example, on turboprop aircraft, and include a plurality of loudspeakers, strategically located within the aircraft cabin. These loudspeakers are driven responsive to reference signals representative of engine or propeller information and error signals from error sensors dispersed in the cabin. The oscillatory drive signals to the loudspeakers are generally controlled via a digital controller according to a known control algorithm, such as the Filtered-x Least Mean Square (LMS) algorithm. Co-pending U.S. patent application Ser. No. 08/553,227 to Billoud entitled "Active Noise Control System For Closed Spaces Such As Aircraft Cabins", describes one such ANC system. ANC systems have the disadvantage that they do not generally address mechanical vibration problems, may be difficult to retrofit into existing aircraft due to potentially significant interior modifications, and are somewhat costly. Furthermore, as the frequency of noise increases, large numbers of error sensors and speakers are required to achieve sufficient global noise attenuation.

Active Structural Control (ASC) systems, may solve the problem of needing a large number of error sensors by attacking the fuselage's vibrational modes directly. For example, by attaching a vibrating device, such as an actuator or shaker, to the interior surface of the fuselage as described in U.S. Pat. No. 4,715,559 to Fuller, global attenuation may be achieved. However, the modifications necessary to retrofit Active Vibration Absorbers (AVAs) in this manner may be prohibitive, as the interior trim may have to be removed and structural modifications made to the stiffening frame members. Therefore, prior art ASC systems are necessarily difficult to retrofit.

Further descriptions of AVAs and active mounts can be found in WO 96/12121 entitled "Active Systems and Devices Including Active Vibration Absorbers (AVAs)". As should be apparent from the foregoing, Active Noise and Vibration Control (ANVC) systems are attractive but somewhat complex and, thus, tend to be more expensive than simpler attenuation systems. Passive and adaptive systems may offer these simpler, less-expensive alternatives.

Passive Tuned Vibration Absorbers (TVAs) are effective at attenuating low-frequency vibration, but are limited in range and effectiveness. Passive TVAs include a flexibly-suspended tuned mass which is tuned by adjusting the stiffness of its flexible suspension or the mass of the suspended tuned mass, such that the device exhibits a stationary resonant frequency (fn). Vibration of the tuned mass absorbs vibration of a vibrating structure at its attachment point. Problematically, TVAs may be ineffective if the engine speed changes, such that the TVA's resonant frequency no longer coincides with the disturbance frequency. U.S. Pat. No. 3,490,556 to Bennett, Jr. et al. entitled: "Aircraft Noise Reduction System With Tuned Vibration Absorbers" describes a passive vibration absorber for use on the engine-mounting pylon of an aircraft for absorbing vibration at specific N1 and N2 frequencies.

When vibration cancellation over a wider range of frequencies is required, various Adaptive TVAs (hereinafter referred to as ATVAs) may be employed. For example, U.S. Pat. No. 3,487,888 to Adams et al., entitled "Cabin Engine Sound Suppresser" teaches an ATVA whose resonant frequency (fn) can be adaptively adjusted by changing an effective length of a beam. Other examples of adaptive vibration absorbers can be found in U.S. Pat. Nos. 5,564,537, 5,236,186, 5,197,692, 5,072,801, 3,767,181, 3,430,902. A good example of 90° phase difference control for an ATVA may be found in U.S. Pat. No. 3,483,951 to Bonesho et al.

In ATVAs including a vibratory mass moving relative to a base, the base motion and the mass motion are usually measured by sensors (ex. acceleration sensors) which produce appropriate vibration signals. Generally, one vibration signal is generated for each motion, i.e., base and mass motion. The signals are then used to generate a control signal which can be used to slowly adjust the relative phase difference between the two signals. When the signals are in quadrature (90° phase difference), good vibration absorption is achieved.

Notably, the frequency range of attenuation may be greatly increased with ATVAs over passive TVAs. Also, the controls needed for ATVAs are relatively simple in comparison to fully-active systems (ex. ANC, ASC, AIC systems). This is because the system adjustments are much slower than the frequency of vibration. The term "Adaptive" as used herein refers to a slow adjustment to a physical parameter (stiffness or mass) of the system whereby the adjustments are made at a speed much slower that the vibrational frequency. By way of example, and not to be considered limiting, 130 Hz vibrations may be attenuated by the TVA, yet the change to the stiffness or mass parameter may occur at only a fraction of that frequency, for example, at 0.2–1.0 Hz. An example of an ATVA may be found in Lawrence Andrew Mianzo's Mechanical Engineering Thesis entitled "An Adaptable Vibration Absorber To Minimize Steady State And Transient Vibrations—An Anaytical and Experimental Study" from Penn State University dated August 1992. As best seen in FIG. 3.3 of that thesis, the ATVA includes a upper and lower leaf springs, first and second absorber masses attached at the outer ends of the leaf springs, and a lead screw nut which threadedly receives a lead screw attached to a stepper motor. The stepper motor is stationarily mounted relative to the lower leaf. Rotation of the stepper motor rotates the lead screw which spreads the leaf springs thereby effecting a change in the stiffness of the leafs. This adaptively changes the resonant frequencies of the ATVA. The Mianzo device, although sufficient for axial vibration suppression, is inadequate for tangential and radial absorption. Further, the Mianzo device includes 2 masses, thus is susceptible to having two resonances. Moreover, the Mianzo device requires either a very large torque motor for spreading high stiffness leaf springs, resulting in a heavy device, or if a small motor is used, the ATVA is only capable of exhibiting low resonant frequencies because of the necessarily low stiffness leaf springs.

Therefore, a need exists for tuned vibration absorber and systems with good vibration response, which are compact, light, have low power requirements and adaptive TVA devices which are readily tunable to specific resonance frequencies.

SUMMARY OF THE INVENTION

Therefore, in light of the advantages and drawbacks of the prior art, the present invention, in one aspect thereof, is a flexible-plate adaptive tuned vibration absorber for absorbing vibration in a vibrating structure and includes a tuned mass suspended from one or more flexible plates, a base member for interconnecting the one or more flexible plates to the structure, and means for adaptively moving the position of the tuning mass relative to the base.

In a first aspect, the Center of Gravity (CG) of the tuned mass may be offset from the Elastic Center (EC) of the one or more flexible plates thereby allowing the vibration absorber to absorb vibrations by mass movements (oscillations) along the radial or tangential directions, or combinations thereof.

In a second aspect, the position of the tuned mass may be adjusted to slidably reposition the tuned mass along a rigid frame interconnected to the one or more flexible plates.

In a third aspect, movement of the tuned mass stresses (deforms) the one or more flexible plates, thereby changing the stiffness of the one or more flexible plates. This operates to bring about a further change in the resonant frequency of the adaptive TVA, a first effect accomplished by the movement of the mass closer to or away from the base, and the other effect from the stiffness change.

In accordance with a fourth aspect of the invention, the tuned vibration absorber, comprises a circular flexible disc, a tuned mass interconnecting and suspended by the circular flexible disc, and means for statically stressing (deforming) the circular flexible disc to effectuate a change in stiffness thereby adjusting a resonant frequency of the absorber.

In accordance with a fifth aspect of the invention, the tuned vibration absorber comprises a base, a flexible plate extending from the base, a tuned mass suspended by the flexible plate, a motor, a reducer (ex. a torque amplifier) interconnecting to the motor, and means for coupling to the reducer whereby energizing the motor causes the tuned mass to adaptively move relative to the base stressing said flexible plate.

According to a sixth aspect, the present invention is a system adapted for attachment to a vibrating structure, comprising a tuned vibration absorber having a tuned stiffness and mass defining a resonant frequency, said tuned absorber further including at least one flexible plate exhibiting the tuned stiffness and having an elastic center, the tuned mass exhibiting a center of gravity which is offset from the elastic center, the tuned mass interconnected to, and suspended by, the at least one flexible plate, a base interconnecting said at least one flexible plate to a vibrating structure, a mass sensor for generating a first input signal representative of a vibration of said tuned mass, a base sensor for generating a second input signal representative of a vibratory characteristic of said vibrating structure, and a controller for processing said first and second signals to generate a control signal to a motor for adaptively moving a position of said tuned mass relative to said base thereby changing a resonant frequency.

According to another aspect, the present invention is a method for controlling vibration of an engine at its operating frequency, said method comprising the steps of: attaching at least one adaptive tuned absorber directly to the engine at a location adjacent to at least one of the spokes, the tuned vibration absorber having a base, at least one flexible member extending from the base, and a tuned mass suspended by said flexible member, and adaptively moving the tuned mass relative to the base to effectuate a change in a resonant frequency of said at least one tuned absorber thereby tracking the engine's operating frequency.

It is an object of the present invention to provide an tuned vibration absorber which demonstrates excellent vibration response, yet is compact, and has low power requirements.

It is another object of the present invention to provide an adaptive tuned vibration absorber which has a resonant frequency which is easily adjustable over a broad range.

It is another object of the present invention to provide an adaptive TVA which is easily tunable and adapted to provide radial and tangential absorption.

BRIEF DESCRIPTION OF THE DRAWINGS

The accompanying drawings which form a part of the specification, illustrate several embodiments of the present invention. The drawings and description together serve to fully explain the invention. In the drawings, like reference numbers are used to designate the same or similar items throughout the several figures wherein.

DETAILED DESCRIPTION OF THE PREFERRED EMBODIMENT OF THE INVENTION

By way of example only, and not by limitation, the invention has been described with reference to an aircraft application, whereby the adaptive TVA minimizes vibration transferred into the cabin from one or more fuselage-mounted engines. However, it will be apparent to a person having ordinary skill in the art that any vibrating structure would benefit from the present invention, including underwing mounted engines, and vibrating machines.

Figure 1:
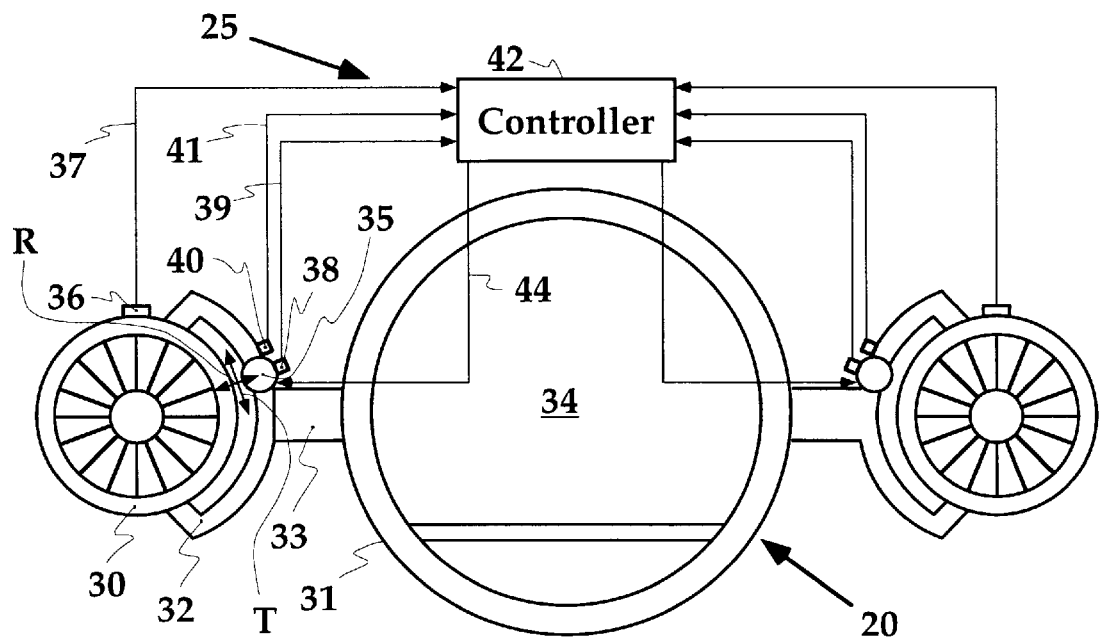
FIG. 1 is a schematic frontal view of the adaptive TVA system as implemented in an aircraft.

Referring now to FIG. 1, an aircraft engine 30 of aircraft 20 vibrates due to rotational unbalances generated by one or more components found therein. This vibration occurs predominantly at two frequencies (N1—fan speed and N2—compressor speed) due to fan and compressor unbalances, respectively. Vibration from the engine 30 is transferred into the aircraft fuselage 31 through a yoke 32 and pylon 33, or other like structure(s), which interconnect the engine 30 to the fuselage 31. The resulting vibration of the fuselage 31, if aerodynamically coupled to the cabin space, creates annoying tonal noise which is heard by passengers seated within the aircraft cabin 34. Further, the vibration may be felt by the passengers, as well.

In order to prevent this vibration from reaching the cabin 34, a system 25 including at least one, and preferably, a plurality of adaptive TVAs 35 are secured to the yoke 32 or pylon 33 structure attached between the engine 30 and the fuselage 31 in order to absorb the vibration. FIG. 1 shows an adaptive TVA 35 attached to the yoke 32 near its point of attachment to the pylon 33. The adaptive TVA 35 shown (which may be any one of the absorbers shown in FIGS. 4–12) vibrates in an orbital fashion within the tangential T/radial R plane of the engine 30, thereby absorbing both radial and/or tangential vibrations. Alternate embodiments could position the TVAs 34 on the pylon 33, elsewhere on the yoke 32, or on the engine 30. The adaptive TVAs may optionally be attached to the stiffening rings or frames of the fuselage 31 directly. In order to absorb vibrations at both N1 and N2 frequencies, some TVAs would be tuned and controlled to the N1 frequency and others to the N2 frequency, thereby controlling both vibrational frequencies.

To achieve effective vibration absorption, tuning and orientation of the TVAs 35 is important. The TVA's 35 should be pretuned to a nominal value and adaptively adjusted within their tunable range to maintain the appropriate phase relationship between vibrational frequency of the engine 30 (the disturbance frequency) and the resonant frequency of the TVA 35. Consequently, the TVA 35 will absorb vibrations even as the frequency of the engine 30 changes during acceleration and deceleration. The TVA's parameters are adjusted to keep its resonance coincident with the disturbance, i.e., the TVA's resonant frequency follows the disturbance frequency. In general, the TVA 35 should be oriented such that it freely resonates in response to vibration at the base 28. In one aspect, the TVA 35 should be attached such that radial (designated R) and/or tangential (designated T) vibrations within the yoke 32 or pylon 33 are absorbed. This will occur when the center of gravity CG of the tuned mass 43 (FIG. 2) vibrates freely in the radial and/or tangential direction. Usually, the vibration will take place in an orbital fashion in response to a base input.

Figure 2:
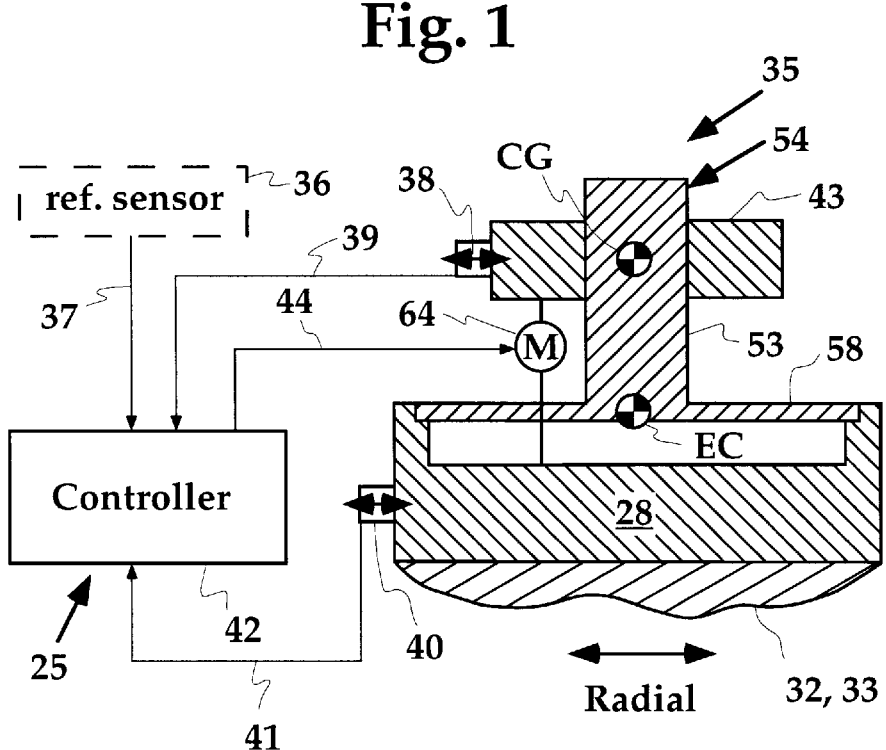
FIG. 2 is a simplistic cross-sectional representation of one TVA of the present invention.

In accordance with another aspect of the invention, as shown in FIGS. 1 and 2, an adaptive vibration control system 25 including a TVA is shown, the system including a mass sensor 38 (secured to mass) which generates a first input signal on a second communication channel 39 preferably representing the radial vibration of the mass 43 (FIG. 2) of the TVA 35. A base sensor 40 (interconnected to base) generates a second input signal (an error signal) on a third communication channel 41 representing the radial vibration of the base (e.g. the yoke 32, pylon 33 or other structure). Preferably, the base sensor 40 is substantially collocated, i.e., positioned on or near, the base 28 of the adaptive TVA 35. Further, the base sensor 40 measures acceleration or other vibration excitation signal in substantially the same direction as the mass sensor 38, either radial or tangential.

Optionally, a reference sensor 36, such as a tachometer, or other suitable sensor, which is preferably located on the engine 30 generates a reference signal on a first communication channel 37. This optional reference signal represents a function of the speed of the engine 30 and, thus, the frequency of the vibrations produced by the vibration source (the engine 30). A complete description of the reference-based control method may be found in Assignee's co-pending application entitled "Control System And Method For Resonant Apparatus Such As Adaptive Tuned Vibration Absorbers" filed concurrently herewith. Each of these signals on the communication channels 37, 39, 41 is preferably delivered into the controller 42 for processing. A control signal is derived by the controller 42 and is delivered through communication channel 44 to the TVA 35. The control signal to a motor 64, or other like adjuster mechanism or article, adjusts the position of the mass 43 relative to the base 28 thereby controlling the resonant frequency thereof. The letter M, shown relative to the motor 64, is indicative of any device that can shift the position of the mass 43 relative to the base 28. In one aspect to be described later, the resonance is controlled via adjusting the position of the tuned mass 43 on a rigid frame 53 extending from a flexible plate 58. By the term "flexible plate", what is referred to is a generally-flat (but could also be slightly conical or curved), thin piece of spring material, such as a disc, conical disc, a reed member, or a leaf spring. In another aspect, the position of the tuned mass 43 is adjusted via a motor 64 which simultaneously statically deforms and stresses the flexible plate 58.

Referring again to FIG. 2, a tuned mass 43 of the TVA 35 is flexibly suspended relative to the vibrating structure (e.g. the yoke 32 or pylon 33), so that the mass 43 responds to the radial and/or tangential (into and out of the paper) vibration of the vibrating structure at the TVAs resonant frequency. Preferably, the TVA 35 is dynamically symmetrical, in that it exhibits the same resonant frequency in the tangential and radial directions, as well as along any vector lying in the radial/tangential plane. The objective of the controller 42 is to generate a control signal on a communication channel 44 to adjust the positional relationship between the mass 43 and the base 28, such that the radial motion of mass 43 is in quadrature (90° phase difference) with the radial motion of the vibrating structure 32, 33. The controller 42 processes the input signals from the mass sensor 38 on the communication channel 39, the base sensor 40 on communication channel 41, and, optionally, the reference signal from the reference sensor 36 on communication channel 37 in order to generate the command signal on the fourth communication channel 44 to adjust the resonant frequency of the TVA 35. In this embodiment, a motor 64 adjusts the position of the mass 43 along a substantially rigid frame 53 of a support frame 54. The spring stiffness being provided by at least one flexible plate 58 (see FIGS. 7–9). In general, the stiffness of the rigid frame 53 is substantially higher than that of the flexible plate 58.

It should be understood that a control signal to the motor 64 to move the tuned mass 43 in one direction will always move the resonant frequency in a first direction, while moving the mass 43 in the other direction would always move the resonant frequency in the opposite direction. As described above, when the first and second input signals are in quadrature (at 90° phase), the TVA 35 resonance frequency substantially coincides with the excitation frequency of the vibration generated by the engine 30 and good vibration absorption is obtained. This minimizes the vibration of base 28, and, thereby, the vibration of the yoke 32. Reducing this vibration of the fuselage 31 has the concomitant result of minimizing the noise within the cabin 34. From the foregoing, it should be recognized that the resonant frequency of the TVA 35 is forced to track the engine operating frequency.

Figure 3A:
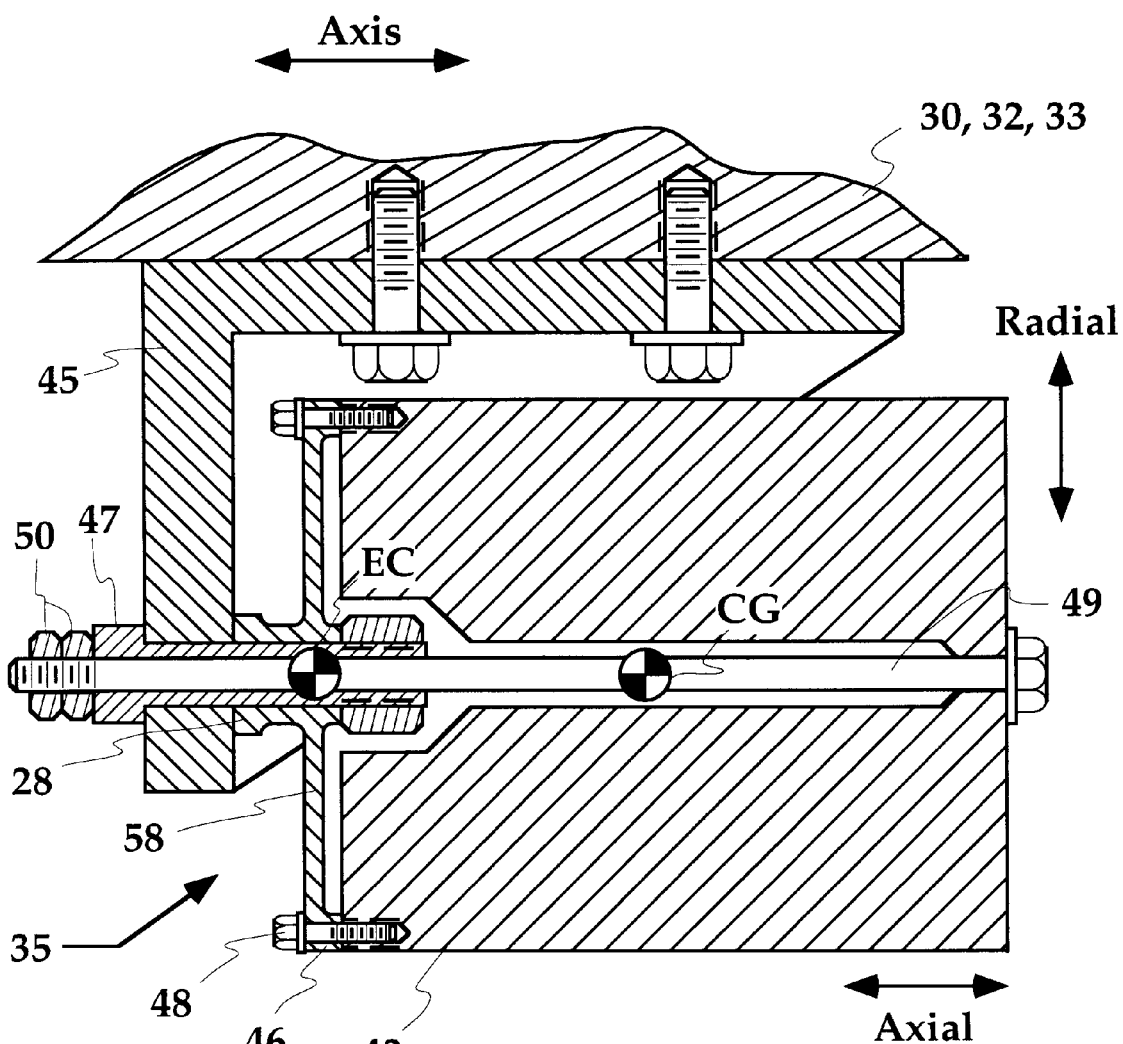
FIG. 3a is a side cross-sectioned view of a flex-plate absorber in accordance with the present invention.

Referring now to FIG. 3a, is shown an embodiment of a passively adaptive flex-plate tuned vibration absorber 35. The absorber 35 includes a tuned stiffness provided by at least one radially extending flexible plate 58 which is preferably a disc, a suspended mass provided by a moveable tuned mass 43, a rigid base 28 for interconnecting to said at least one flexible plate 58 to a vibrating structure 32, and an adaptive adjuster for moving a center of gravity CG position of the tuned mass 43 relative to said base 28. It should be apparent from the drawing that the Center of Gravity CG is offset from the Elastic Center EC. An application of force (such as an inertial force) on the mass 43 which acts through the elastic center EC will impart zero rotation to the mass 43. Contrarily, when the Center of Gravity CG is offset from the Elastic Center EC, providing a force at the CG causes both translation and rotation of the mass. Prior art adaptive TVAs such as taught in the Mianzo's Penn State Thesis mentioned above are not adapted for absorbing radial and/or tangential vibrations, but are only adapted for axial response because the CG and EC are coincident therein. Contrarily, the TVA 35 in one aspect of the present invention responds well to radial and/or tangential vibration within the tuned range. It will become apparent that the TVAs 35 of FIGS. 4–14 have similar offsets which make them each well adapted for adaptively absorbing radial and/or tangential vibrations.

Figure 3B:
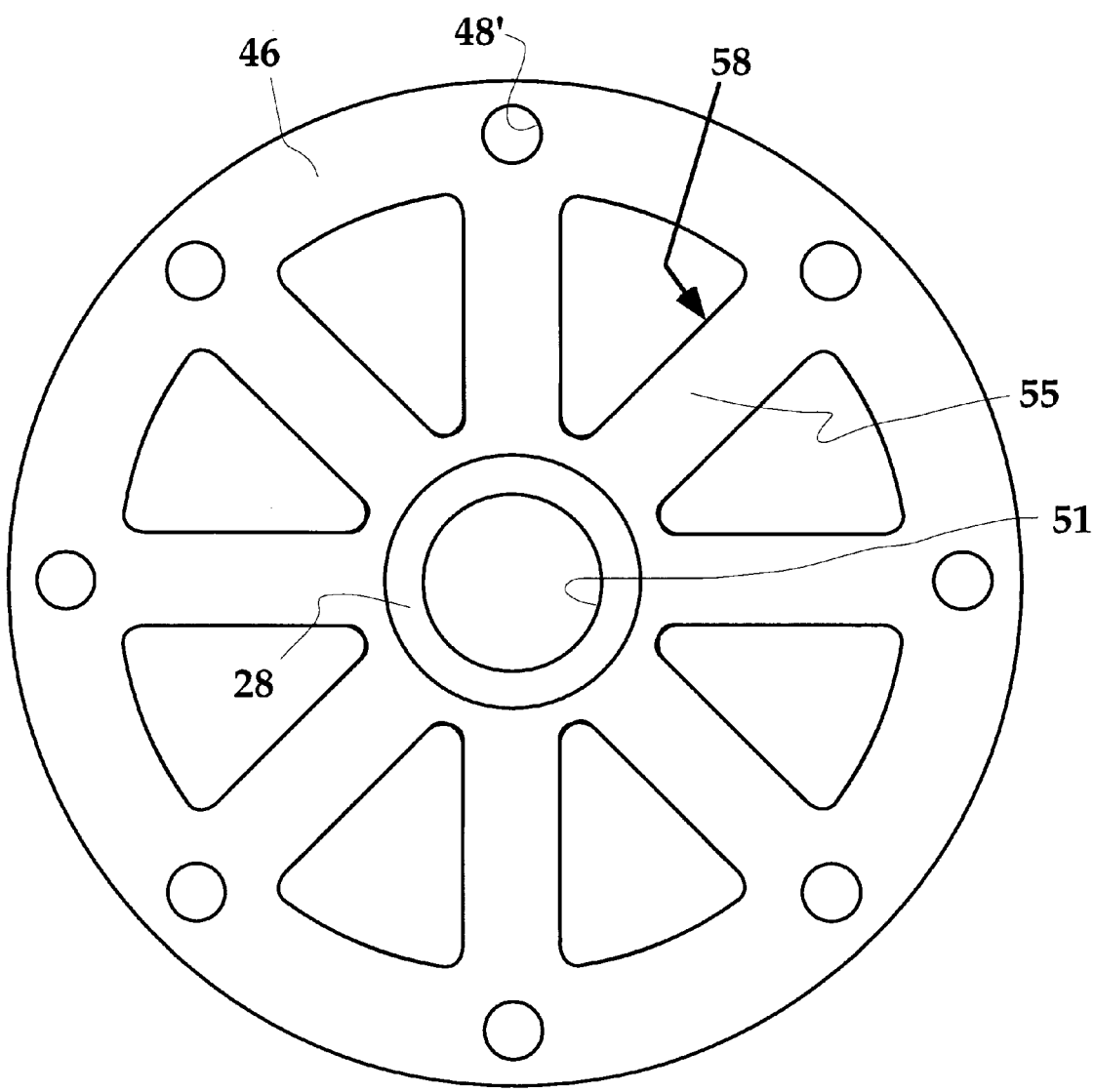
FIG. 3b is an end view of an alternate type of flex-plate.

The solid flexible disc-shaped plate 58 attaches between the base 28 and a thicker outer edge ring 46. By the term "disc", what is meant is a thin, flat or slightly conical shaped, circular member. The central rigid portion from which the disc 58 extends, connects to bracket 45 by way of bolt 47. The outer edge ring 46 is secured to the tuning mass 43 via fasteners 48. An adjuster in the form of a threaded bolt 49 and nuts 50 functions as the means to adaptively adjust the amount of axial force applied to the flexible plate 58 and, thus, the position of mass 43. Nuts 50 are adjusted to deform the flexible plate 58 in conical flexion. The amount of axial load applied varies the stiffness of the flexible plate 58 and, thus, the resonant frequency of the TVA 35. This TVA 35 is designed to predominantly vibrate in the radial and tangential plane. As discussed above, the center of gravity CG is spaced apart from the elastic center EC of the flexible plate 58. Therefore, any radial vibration of the base 28 at the resonant frequency will result in large radial motions of the CG of the mass 43. These motions will be out of phase by 90° at resonance. In other words, the mass 43 rocks or pivots about the elastic center EC. This places the adjuster bolt 49 in slight bending (functioning as a beam in bending) also. FIG. 3b illustrates an end view of an alternate flexible plate 58 including outer ring 46 having a plurality of axial holes 48' for receiving fasteners 48 (FIG. 3a). The base 28 includes a bore 51 therethrough which receives bolt 47 (FIG. 3a). This flexible plate 58 includes a plurality of equally spaced radially directed spokes 55. All flexible plates described herein are preferably constructed of a metal spring material or other fatigue resistant spring material, such a 17-4 PH steel.

Figure 4:
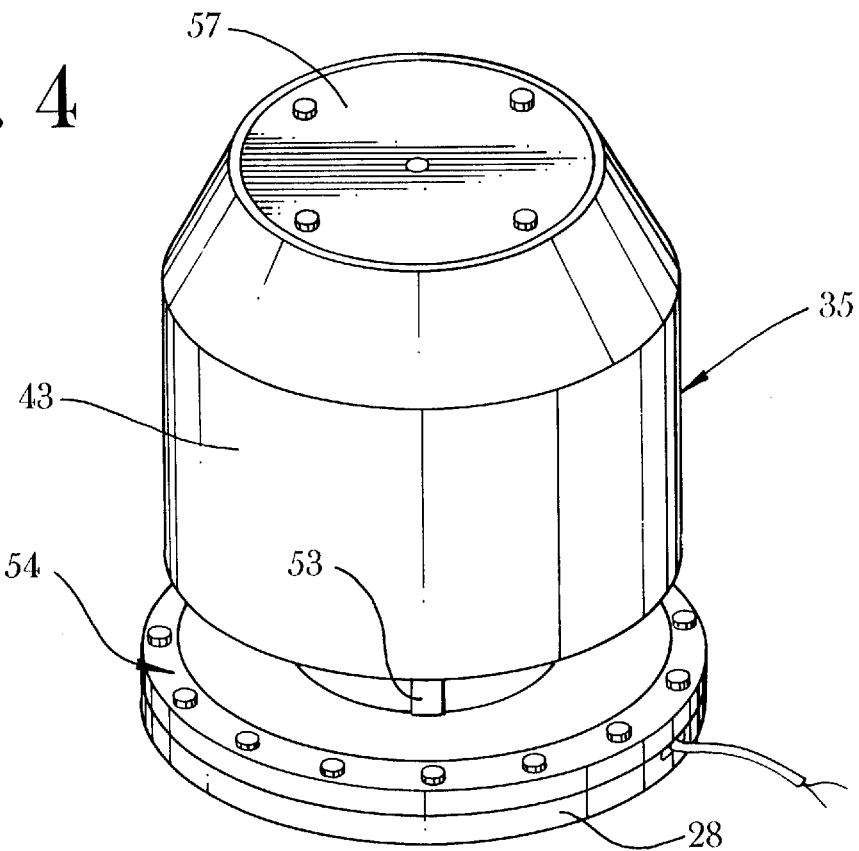
FIG. 4 is an isometric view of an embodiment of a flex-plate adaptive TVA.
Figure 5:
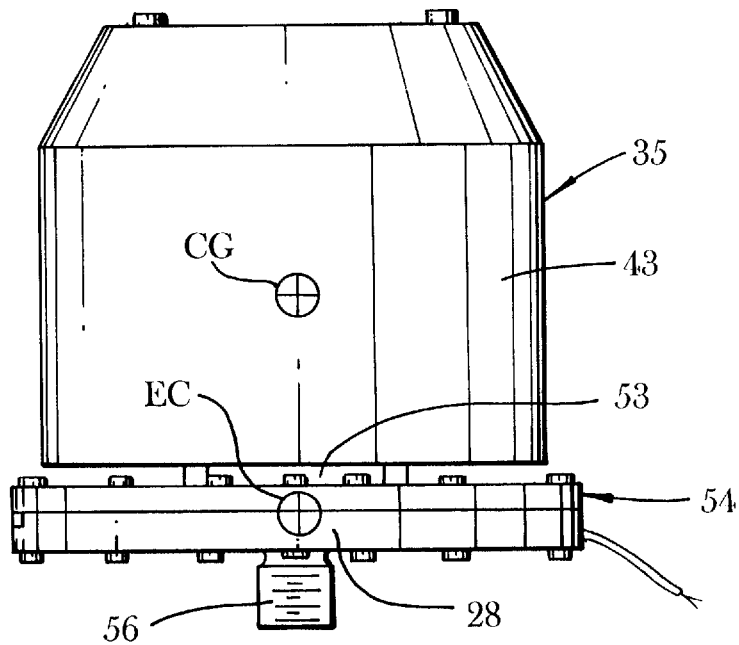
FIG. 5 is a side view of the adaptive TVA shown in FIG. 4.
Figure 6:
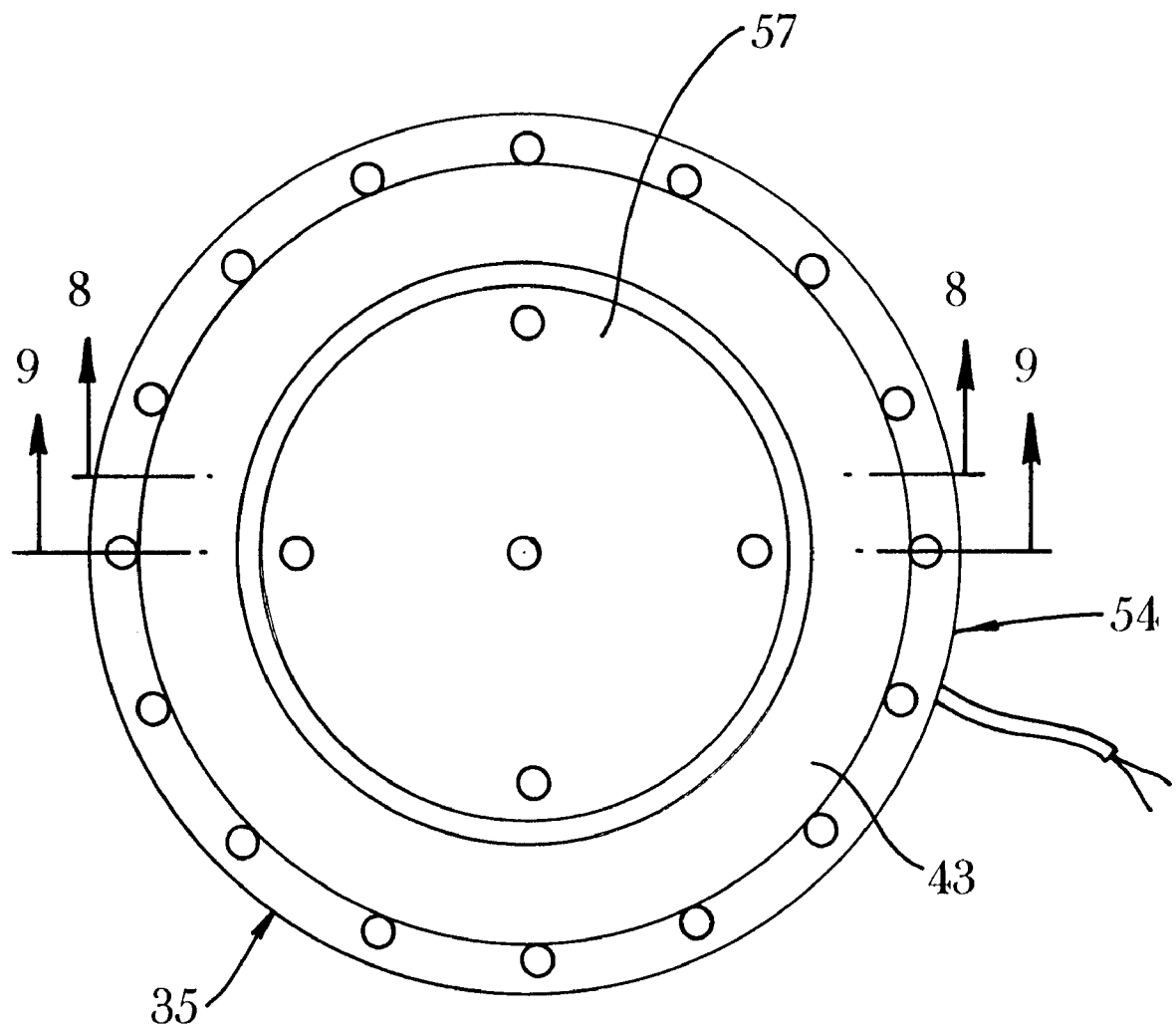
FIG. 6 is a top view of the adaptive TVA shown in FIG. 4.

Referring now to FIGS. 4–6, there is shown an external, isometric view of an adaptive TVA 35 of one aspect of the present invention. The TVA 35 may be tuned to absorb vibrations at various frequencies by moving the tuned mass 43 along a rigid frame 53 that is integral to a support frame 54. A base 28 is attached to a vibrating structure (e.g. the yoke 32) by means of a threaded stud 56. The attachment of the base 28 to the vibrating structure could alternatively be accomplished by any satisfactory means such as bolting, welding, riveting, gluing, etc. The mass 43 is preferably interconnected to a top cap 57 which interconnects the mass 43 to the motor 64 (FIGS. 7–9).

Figure 7:
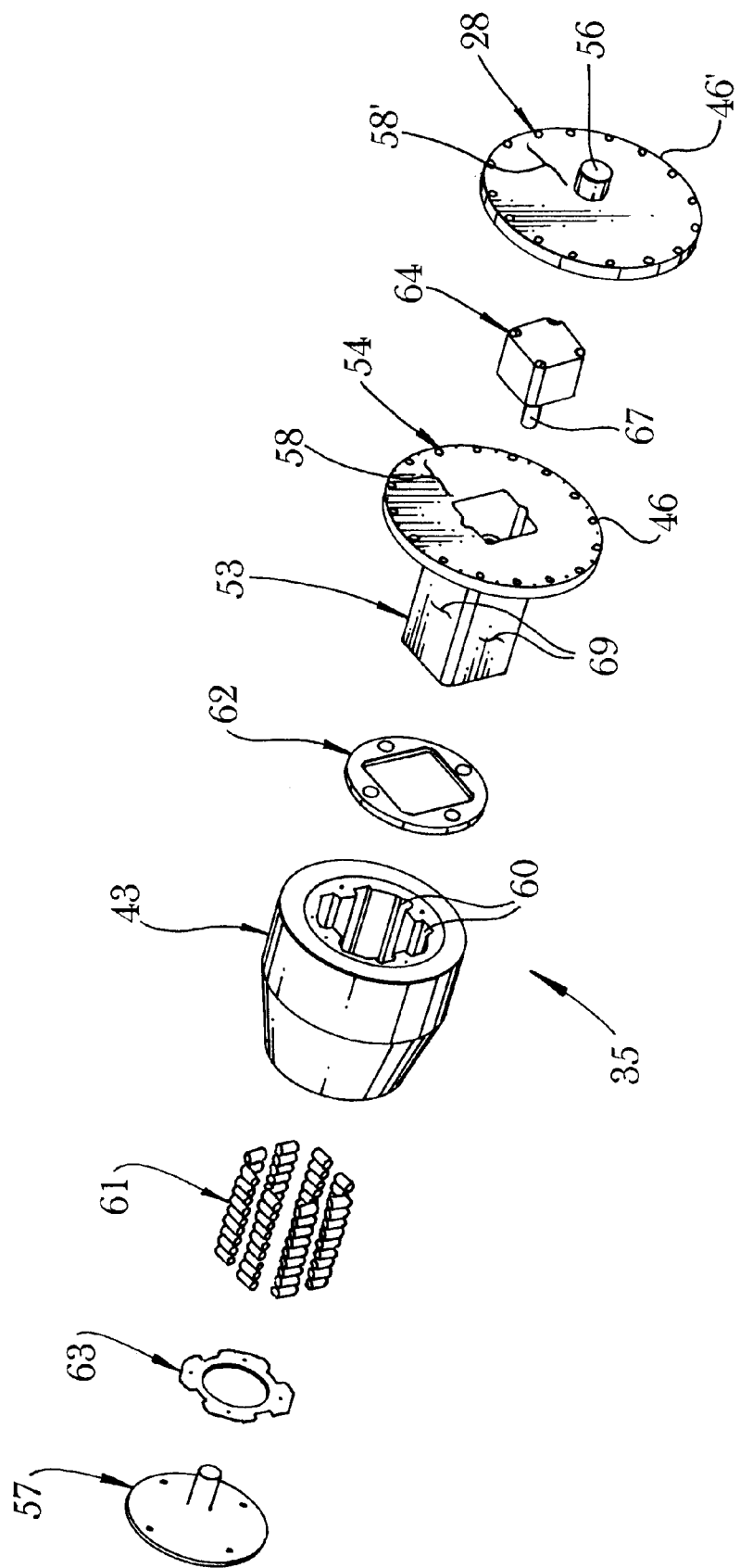
FIG. 7 is an exploded assembly view of the embodiment of the adaptive TVA shown in FIG. 4.
Figure 8:
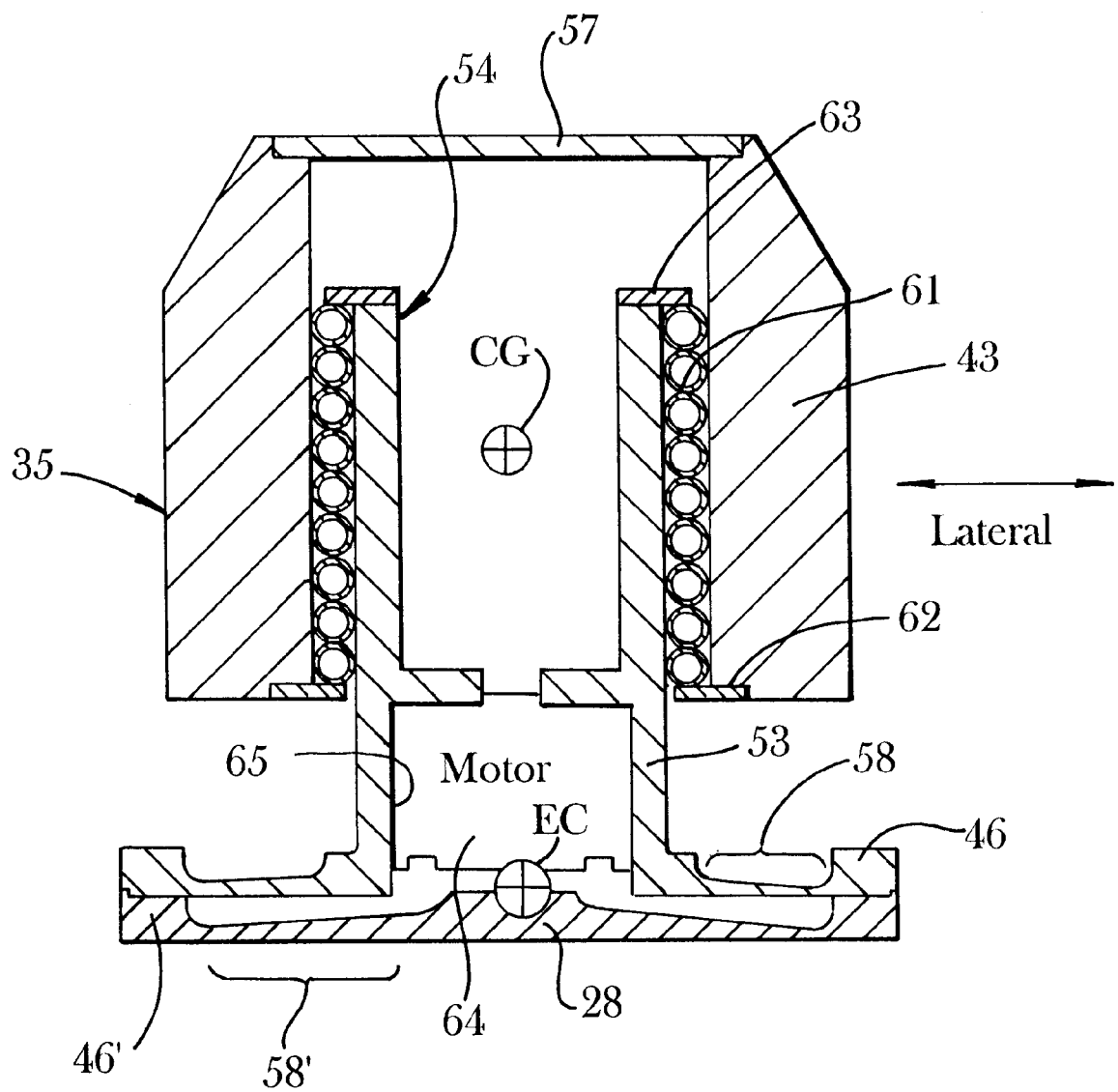
FIG. 8 is a cross-sectional side view of the adaptive TVA of FIG. 6.
Figure 9:
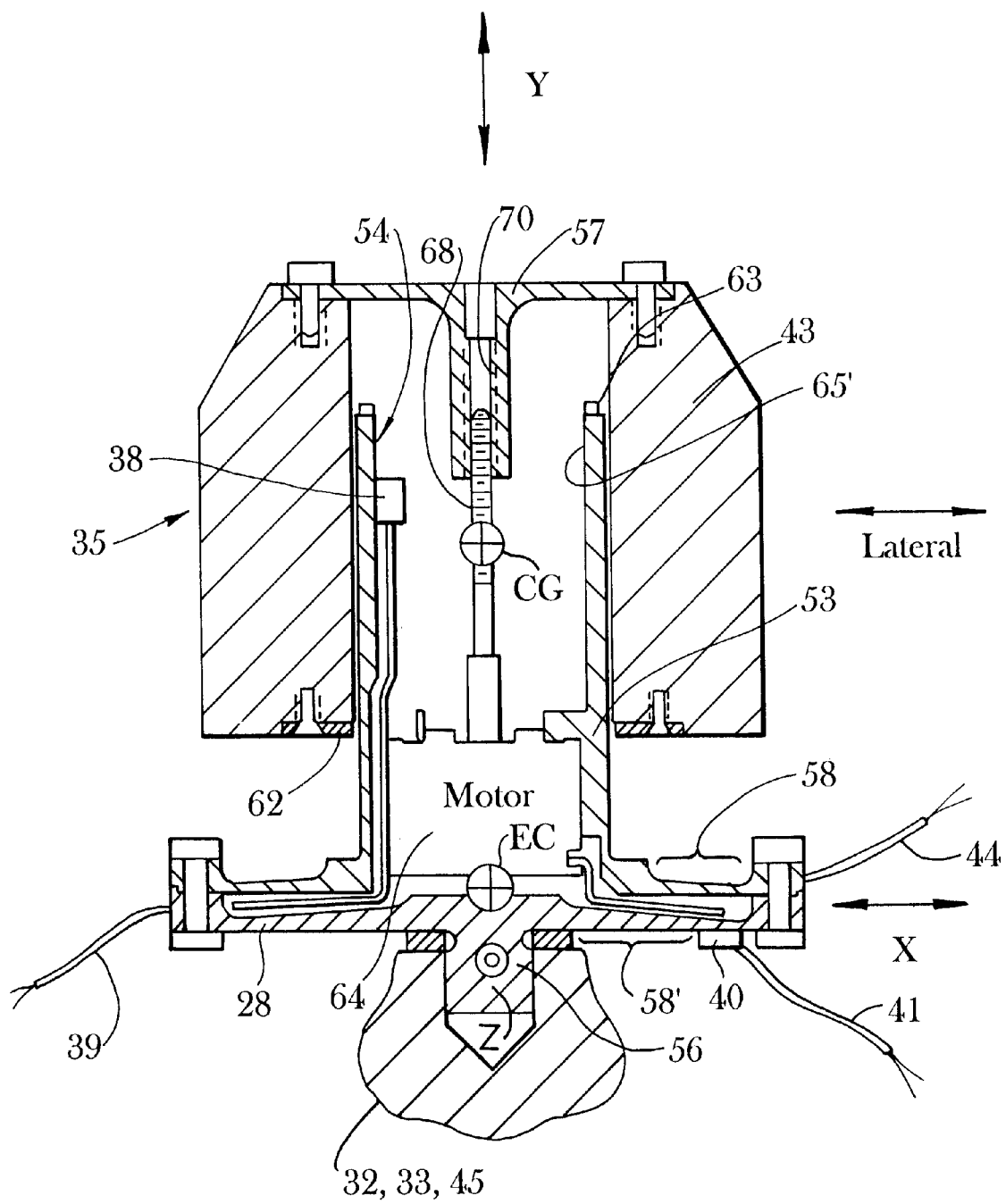
FIG. 9 is a cross-sectional side view taken along a different section of FIG. 6.

Referring now to FIGS. 7–9, the adaptive TVA 35 comprises the base 28 preferably having a disc-like shape, a mounting ring 46' and a centrally-located threaded stud 56 which is used for affixing the base plate 28 to a vibrating structure (e.g. yoke 32). The support frame 54, preferably includes a disc-like, radially-extending, flexible plate 58 between its outer ring 46 and the rigid frame 53. The base 28 may also include a similar flexible plate 58'. The base flexible plate 58' extends radially from the centrally located stud 56 to the ring 46'. Preferably, each flexible plate 58, 58' is tapered from a thickest portion at the inner-most radial dimension to a thinner portion at an outermost radial dimension to maintain constant bending stresses therein. The support frame 54 and base plate 28 are firmly attached to each other at their mutual rings 46, 46' using threaded fasteners, rivets, welds, glue, etc.

The substantially-rigid frame 53 of the support frame 54 extends substantially perpendicular to the plane of the flexible portion 58. Further, the flex portions 58, 58' of the support frame 54 and base 28, are preferably both substantially the same size. When a lateral force, for example, as indicated by arrow labeled "lateral" in FIGS. 8 and 9, is applied to the frame portion 53 due to inertial forces acting on the mass 43, the two flexural portions 58, 58' are flexed in unison in a bending mode. The two flexible plates 58, 58' cooperatively flex to allow the frame portion 53 to pivot, or vibrate, in a back and forth relation to the base 28. The spring rate or stiffness of the two flexural portions 58, 58' is controlled by the diameters of their inner and outer peripheries, the Young's modulus of their material, and their thicknesses. Notably, the spring rates of each portion 58, 58' individually, and in combination, are significantly less than the bending stiffness of the rigid portion 53. Preferably, the flexible plates are uniform and symmetrical discs, such that they exhibit the same stiffness in bending in the radial and tangential plane. Furthermore, although two flexible plates are shown, the flexing could occur only in flexible plate 58, or only in plate 58', the other being substantially rigid. Preferably, both flex plates 58, 58' are used to minimize bending stresses and to achieve the desired stiffnesses.

Again referring to FIGS. 7–9, the tuned mass 43 fits over the frame portion 53 of the support frame 54. The mass 43 includes a plurality of integral tracks 60 (preferably eight) which are adapted to cooperate with preferably four parallel surfaces 69 formed on the frame portion 53. Tracks 60 and surfaces 69 provide a space for preferably eight sets of hollow-compliant roller bearings 61 to operate between, two sets contacting each surface 69. The roller bearings 61 contact tracks 60 and surfaces 69 and facilitate ease of movement of the mass 43 along the frame portion 53 because of the lack of friction and/or stiction. A lower bearing retainer 62 is attached to the end of the mass 43 closest to the base 28 with threaded fasteners, rivets, glue, or other means for fixedly attaching. An upper bearing retainer 63 is attached to the end of the frame portion 54, that is remote from the base 28, with like attachment means. The lower and upper bearing retainers 62, 63 contain the set of roller bearings 61 between the tracks 60 of mass 43 and the surfaces 69 of frame portion 53. Alternate embodiments of the TVA 35 could use ball bearings, bushings, a boundary-layer lubricant, or other method to facilitate the movement of the mass 43 along the frame portion 53. It should also be recognized that the stiffness of the compliant roller bearings 61 is also substantially greater than the effective stiffness of the flexible plate(s).

The frame portion 53 forms an elongated, substantially-rectangular rigid beam which includes a hollow 65 adjacent to the flex plate 58. This hollow 65 is adapted to receive a motor 64, such as a stepper motor, for moving the tuned mass 43 in an axial direction along the frame 53.

A rod 68 (FIG. 9) extends lengthwise through a hollow 65' formed in the frame 53 and includes threads which engage a like threaded portion 70 within the top cap 57. The top cap 57 is rigidly attached to the top of the mass 43 by threaded fasteners, rivets, glue, or other means for fixedly attaching. Therefore, when the rod 68 rotates via energizing motor 64 via electrical channel 44, it moves the mass 43 closer to, or further away from, the base 28 along axis Y (axial direction).

The motor 64, rotates the rod 68 within the top cap 57 to form a linear actuator subassembly. A suitable stepper motor includes model 216-10-05 by Lin Engineering of Santa Clara, Calif. and is rated at 16 in. oz. stall torque and 9 in. oz. running torque. Alternatively, other suitable means of moving the mass 43 toward and away from the base 28, such as a DC motor.

Also shown in FIG. 9 is a mass sensor 38, which preferably takes the form of an accelerometer. The mass sensor 38 is preferably attached to an interior surface within the hollow 65' for sensing the lateral (radial) motion of the mass 43 and generating the mass signal in channel 39. A base error sensor 40, also preferably an accelerometer, is attached either to the base 28 as shown in FIG. 9 or to the vibrating structure (yoke 32 or pylon 33), for sensing the lateral motion of the base 28 (or the yoke 32 or pylon 33) and generating the error signal in channel 41. Other suitable sensors instead of accelerometers 38, 40 may be used to sense vibration.

Again referring to FIG. 7, the TVA 35 is assembled by attaching the rod 68, shown in FIG. 9, to the shaft 67 of the motor 64. The motor 64 is attached to the support frame 54 in the hollow 65 within the rigid frame 53 using threaded fasteners, rivets, glue, or other suitable means for fixed attachment. The base 28 is then attached to the support frame 54 by securing rings 46, 46' (FIGS. 8, 9) together. Next, the lower bearing retainer 62 is attached to the lower portion of mass 43. The mass 43 may be heated to expand it and is positioned over the frame portion 53. The hollow roller bearings 61 are quickly slid into the space between the roller tracks 60 of the heated mass 43 and the surfaces 69 of frame 53. The mass 43 is allowed to cool and contract to laterally preload the hollow roller bearings 61 to the desired pre-loading. The hollow nature of the roller bearings 61 is preferred because it allows pre-loading to be achieved with wider tolerances in the dimensions of the frame portion 53 and the tracks 60 of mass 43 than would result with solid bearings, without risking excessive pre-loading of the roller bearings 61. Preferably, no radial play would be desired in the connection between the mass 43 and frame 53 which would cause rattling.

Referring now to FIGS. 7–9, the upper bearing retainer 63 is attached to the end of frame portion 53 that is remote from the base 28 after inserting rollers 61. The top cap 57 is then threaded onto the rod 68 and affixed to the mass 43. A threaded stud 56 located at the base 28 is used to attach the TVA 35 to the vibrating structure 32, 33.

A detailed functioning of the adaptive tuned vibration absorber may be ascertained by referring to FIG. 9. The TVA 35 is mounted on a structure, such as the yoke 32 that vibrates in the X–Z plane (Z axis shown into and out of the paper). The flexible plates 58, 58' function as a spring member with a preferably symmetrical force (or torque) vs. deflection spring rate about any axes in the X–Z plane. Those components of the TVA 35 which are attached to the frame 53 (i.e., the motor 64, the lower bearing retainer 62, the mass 43, the roller bearings 61, the upper bearing retainer 63, the top cap 57, the threaded rod 68, and the mass sensor 38) collectively are included in the mass of the tuned spring-mass resonant system. The TVA 35 may be easily tuned to a range of resonance frequencies by moving the mass 43 up and down the frame portion 54, generally along the Y axis, as shown in FIG. 9. By way of example, a resonant frequency range of between about 110 Hz and 140 Hz was obtained by an experimental prototype tested.

Figure 10:
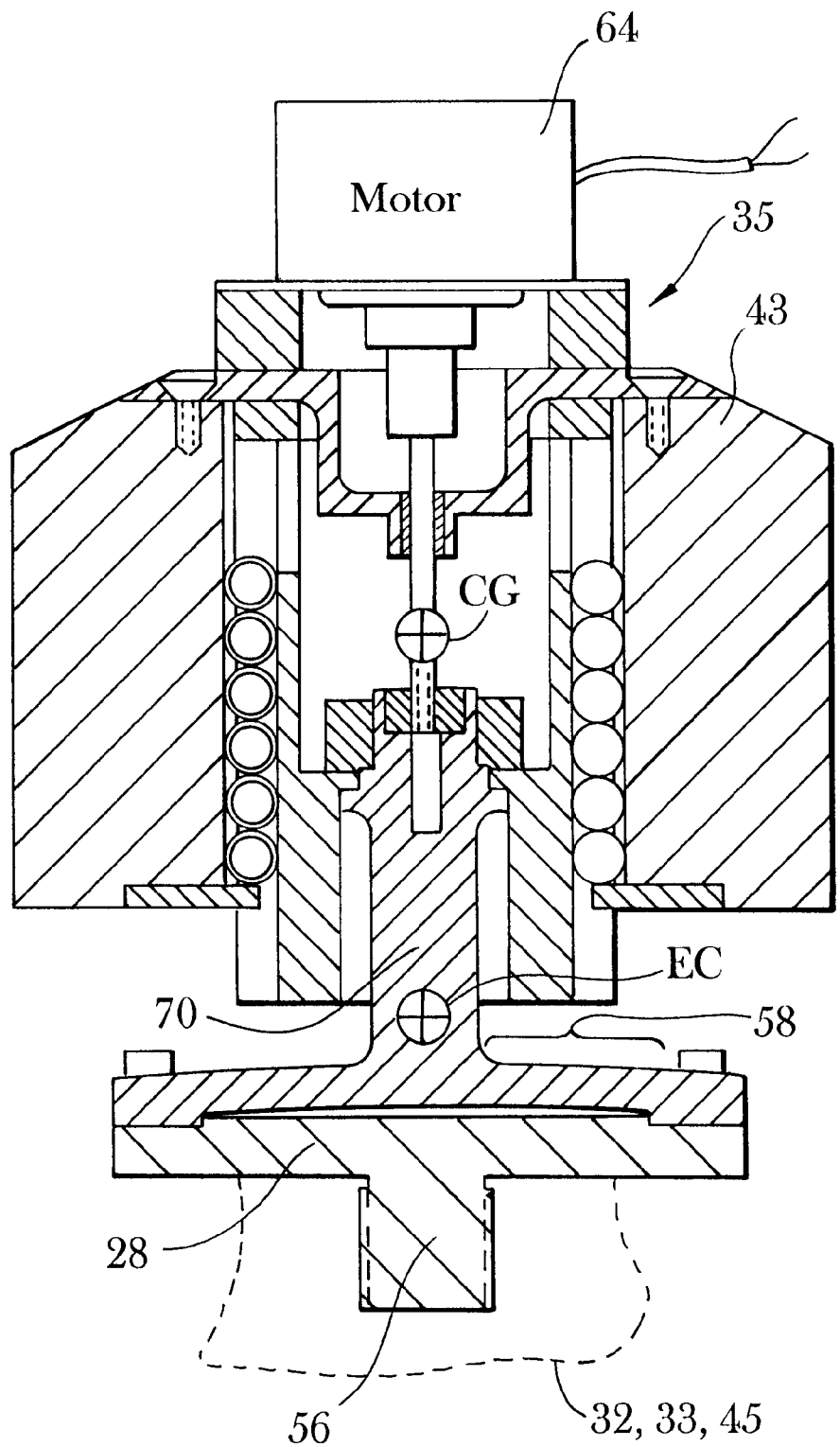
FIG. 10 is a cross sectional side view of an alternate embodiment of adaptive TVA.

An alternate embodiment of the TVA 35 is shown, for example, in FIG. 10. Here, the motor 64 is located on top of the tuned mass 43 and on an external surface of the TVA 35. The configuration in FIGS. 7–9 places the stepper motor 64 proximate to the base 28 where it is subject to less vibration. Therefore, when space permits, the configuration of FIGS. 7–9 is preferable, as it increases the expected lifespan of the motor 64. In the FIG. 10 embodiment, the stiffness is provided by a single flexible plate 58 interconnected between the mass 43 and the base 28 which may be flexed alone, or in combination with a portion of a beam 70.

Figure 11:
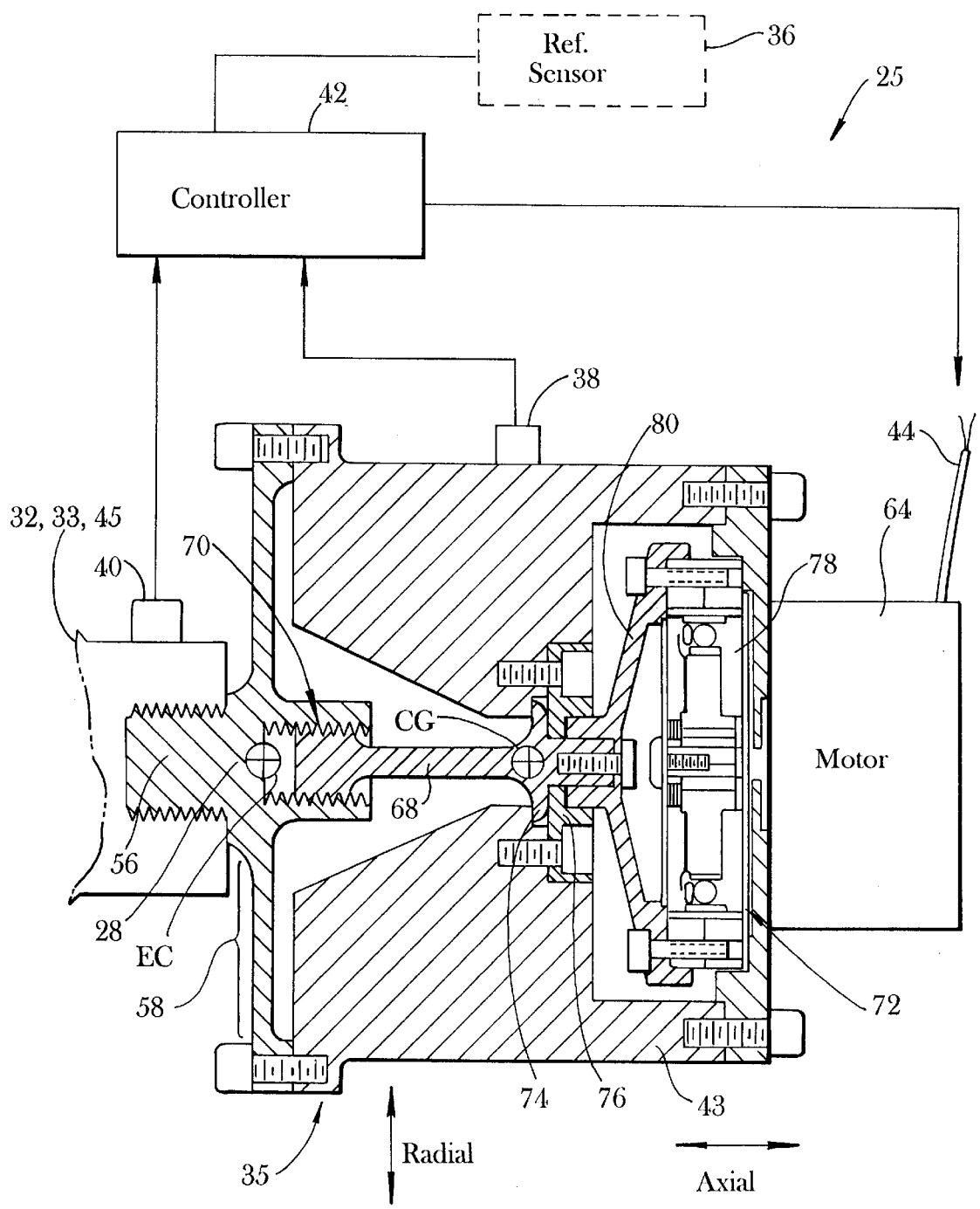
FIG. 11 is a cross sectional side view of a single flex-plate adaptive TVA.

FIG. 11 illustrates another embodiment of TVA 35. In this TVA 35, the mass 43 is still flexibly supported by a flexible plate 58, and a motor 64 is used to change the position of the mass 43 relative to the base 28. In operation, the motor 64 is rotationally coupled to a reduction assembly 72 which gears down the rotation of the motor 64 to a fraction of its original speed, thereby also multiplying the torque output of the motor 64. This gear reduction assembly 72 is interconnected to a rod 68 which includes external threads which are received in a like threaded portion 70 in the base 28. Preferably a power screw thread is used on rod 68 and base 28, such as an ACME thread. Formed within the mass 43 is a slip section which rotatably receives a projection 74 on rod 68. Projection 74 is rotatably received between a pocket formed in mass 43 and a retaining plate 76 secured thereto. The reduction assembly 72 includes a reducer 78, such as gear or harmonic drive and a conical connector 80 for attaching to the rod 68 via screws, or the like. The reducer 78 is preferably a Harmonic Drive manufactured by Harmonic Drive Technologies of Peabody, Mass, part no. HDF20 which has a preferable gear reduction ratio of higher than 80:1, and more preferably about 120:1–160:1 to allow for a small motor. Other means for reduction may also be employed.

A flat portion formed on the end of the rod 68 is received in a slot formed in connector 80 to restrain rotation therebetween. Connector 80 attaches to reducer 78 by way of fasteners. The motor 64 attaches to reducer 78 via a screw and rotation is restrained via a key and keyway system. In operation, the motor 64 is driven in response to a control signal in channel 44. This drives the input to the reducer 78 thus turning the connector 80 at a much slower rate and higher torque. This rotates rod 68 which threads rod 68 into threaded portion 70. Depending on the direction, this moves the position of the mass 43 relative to the base 28. Moving the mass 43 to the left via screwing right hand threaded rod 68 into portion 70 decreases the distance between the center of gravity of the mass 43 and the base 28, thereby increasing the natural frequency. The effect is further compounded by the deforming and statically stressing of the flexible plate 58 which changes its stiffness (generally stiffening) which further increases the resonant frequency. Within the system 25, the controller 42 receives inputs from the mass and base sensors 38, 40 and/or optional reference sensor 36 and generates a control signal to adaptively drive the motor 64 thereby accomplishing a change of position of mass 43 relative to base 28.

Figure 12:
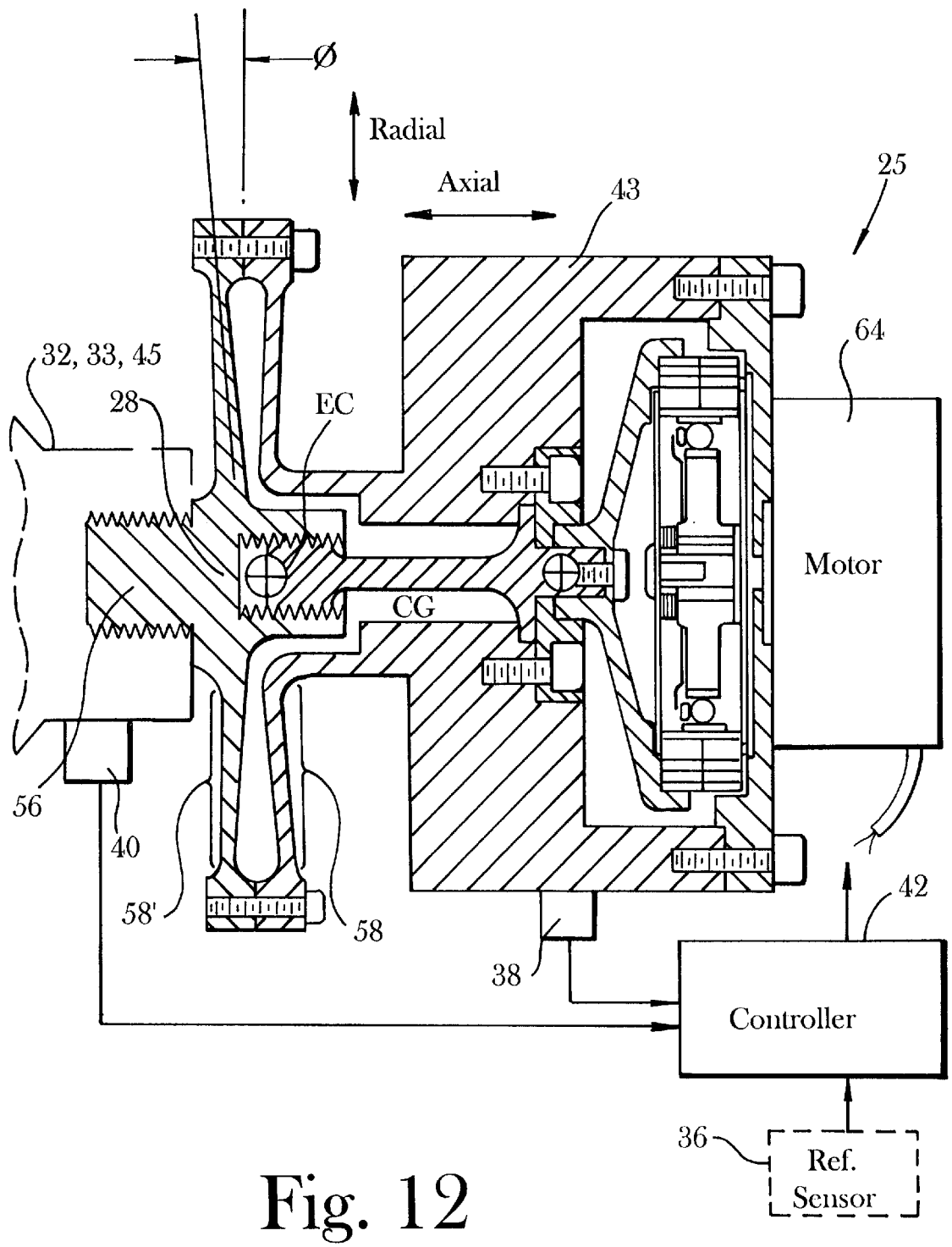
FIG. 12 is a cross sectional side view of a double flex-plate adaptive TVA.

FIG. 12 illustrates an embodiment including two cooperating flexible plates 58, 58'. Notably, each plate 58, 58' is conically-shaped (including a cone angle ø). Spreading the plates 58, 58' apart via energizing motor 64 actually softens the stiffness thereof until an angle of about ø=0° is achieved, i.e., where the plates 58, 58' are flattened out. Moving the mass 43 to the right also lowers the resonant frequency. Likewise, moving the central portions of plates 58, 58' together stiffens the spring assembly comprising plates 58,58' and also moves the mass CG closer to the base 28. Both of these effects increase resonant frequency. A frequency range of about 100–140 Hz was also demonstrated with an experimental prototype that was tested. Shown also is the system 25, including controller 42 receiving inputs from the mass and base sensors 38, 40 and/or optional reference sensor 36 and deriving a control signal to motor 64 to adaptively drive same to accomplish a change of position of mass 43 relative to base 28.

Figure 13:
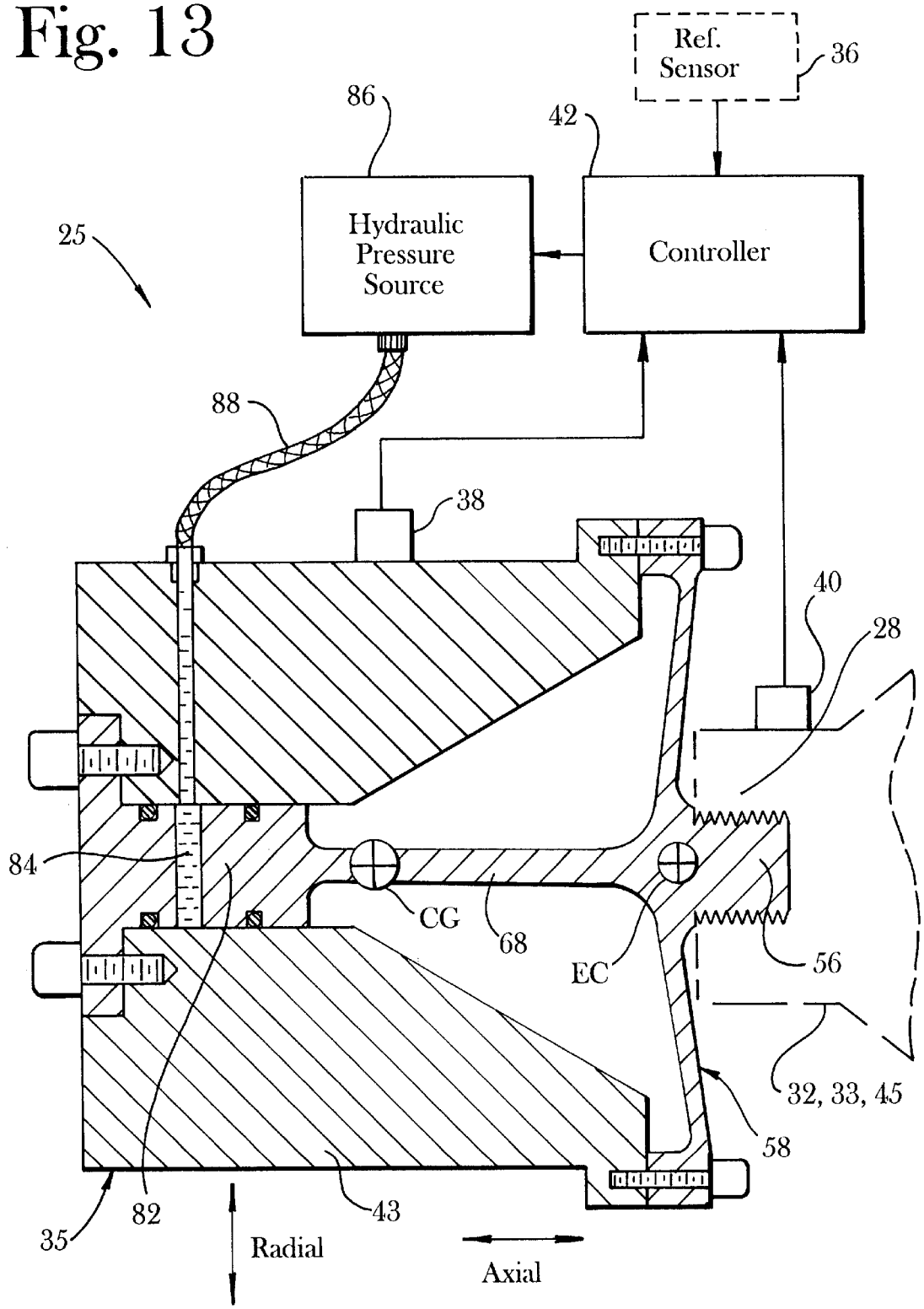
FIG. 13 is a cross sectional side view of a hydraulically actuated flex-plate adaptive TVA.

FIG. 13 illustrates a system 25 embodiment including an adaptive TVA 35 where hydraulic pressure from a pressure source 86 is supplied to a chamber 84 via a hose 88. The hydraulic pressure is statically adjusted by a control signal from controller 42 based upon inputs from mass and base sensors 38 and/or from optional reference sensor 36. The controlled static pressure acts axially against the piston 82 which interconnects to the base 28 via rod 68. Changing pressure moves the position of the mass 43 relative to the base, as well as flexing the flexible plate 58. In this single flexible plate embodiment, moving the mass 43 to the left flattens out the plate 59, thus reducing its pivotal stiffness. Resultantly, this lowers the resonant frequency. A threaded stud 56 located at the base 28 is used to attach the TVA 35 to the vibrating structure 32, 33.

Figure 14:
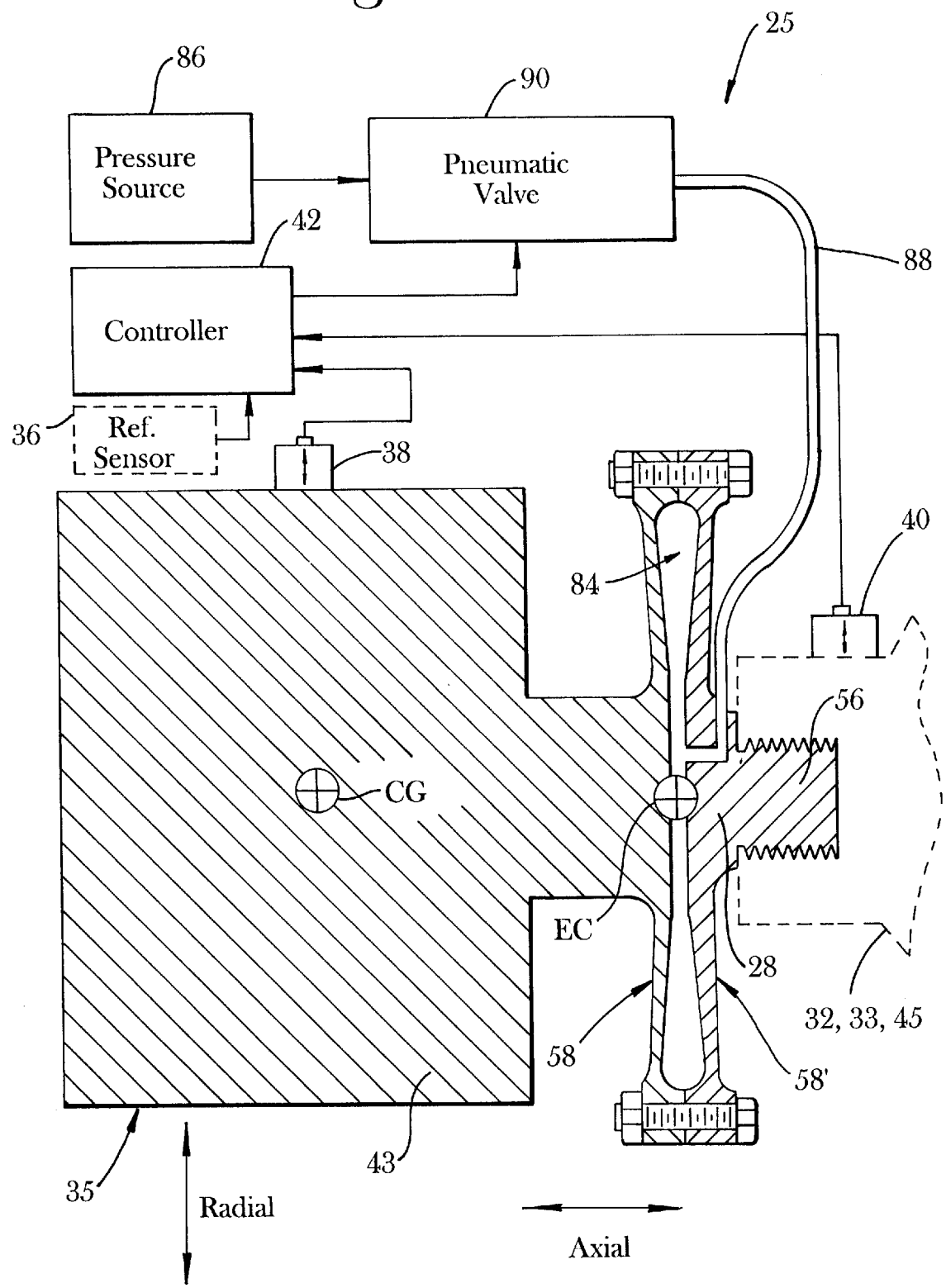
FIG. 14 is a cross sectional side view of a pneumatically actuated flex-plate adaptive TVA.

A final embodiment of system 25 including TVA 35 is shown in FIG. 14. This adaptive TVA 35 is comprised of a mass 43, a plurality of interconnected and cooperating conical flexible plates 58, 58', and a base 28. A chamber 84 is included within the device which receives pneumatic pressure from a pressure source 86 through hose 88. Controller 42 receives inputs from mass and base sensors 38, 40 and optional reference sensor 36 and produces a control signal which is provided to pneumatic valve 90 to supply the appropriate pressure to chamber. An appropriate feedback pressure sensor (not shown) may be included in the hose, chamber, or elsewhere. Pressurizing chamber 84 with air expands chamber 84 and moves the position of the mass 43 relative to the base 28 and also stresses the flex plates 58, 58' thereby reducing their stiffnesses. Adaptively adjusting the pressure within chamber 84 then has the concomitant result of changing the resonant frequency of the TVA 35. For optimal operation, the plate 58' is preferably slightly thicker than plate 58.

In the previous four embodiments of FIGS. 11–14, the resonant frequency change is most prevalent in the radial direction, but could be used for vibration absorption axially. If used as an axial vibration absorber, the acting directions of the base and mass sensors 38, 40 would be realigned with the axial axis. Also, in the embodiments of FIGS. 2–14, the CG is offset from the EC.

Figure 15:
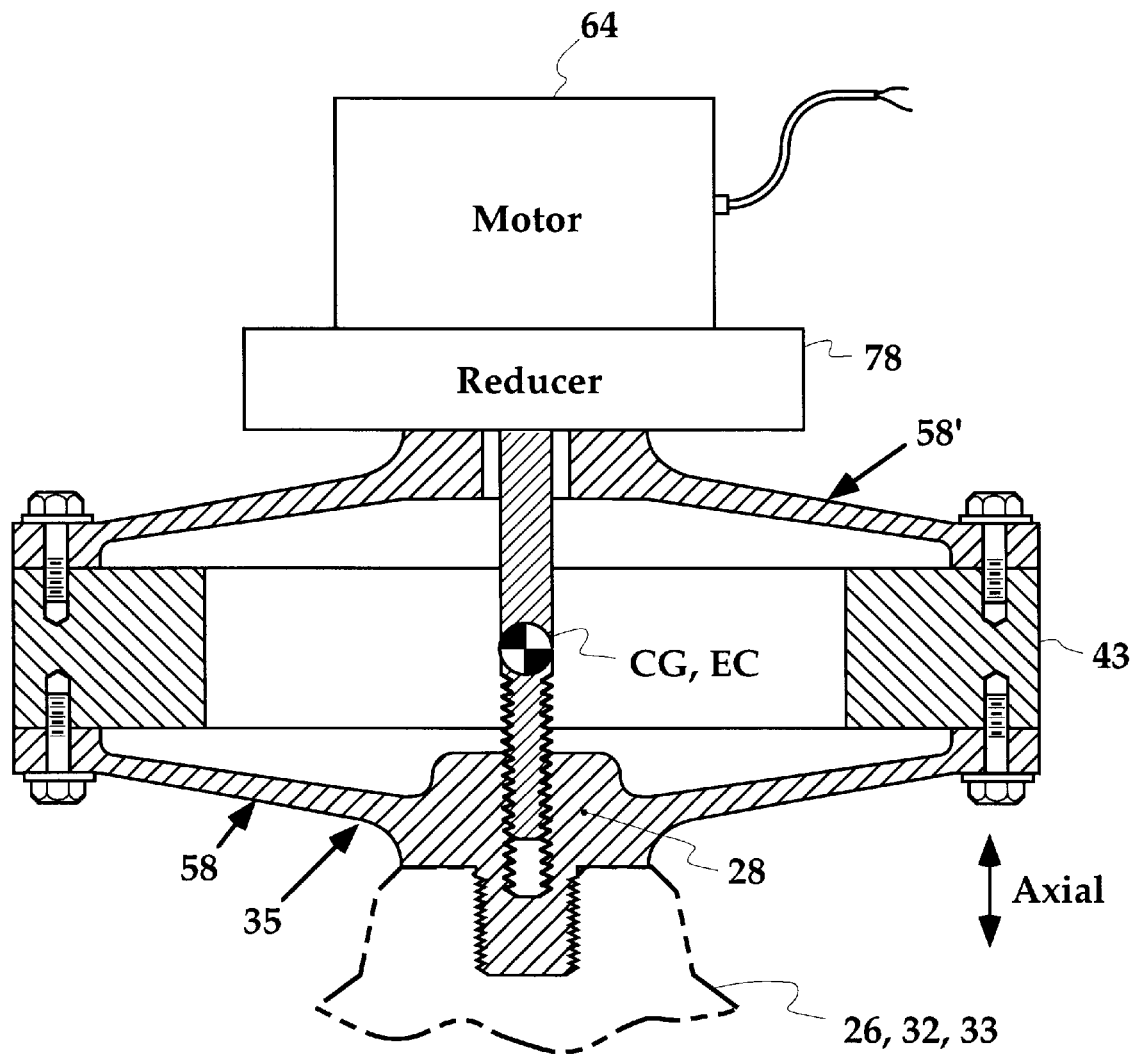
FIG. 15 is a cross sectional side view of another adaptive TVA.

FIG. 15 illustrates an embodiment of axially-acting adaptive tuned absorber. In this embodiment, the center of gravity CG and elastic center EC are collocated. The adaptive tuned vibration absorber 35 comprises a base 28, a preferably disc-shaped flexible member 58 extending radially from the base 28, an annular-shaped tuned mass 43 suspended by said flexible member 58 and attached to the annular ring mass 43 at its outer periphery, a motor 64 interconnected to a reducer 78, and a threaded rod 68 interconnected to the reducer 78. The threaded rod 68 threadedly engages the base 28 whereby energizing the motor 64 rotates said rod 68 thereby moving the position of the tuned mass 43 relative to said base 28. The absorber may also include a second preferably disc-shaped flexible member 58'. This absorber 35 improves over the prior art by having a single mass which vibrates axially, thereby producing one discreet mode of axial vibration within the tuned range. Further, the addition of the reducer 78 allows the motor to be made much smaller. Making the flexible plate 58 a disc-shaped member reduces the bending stresses.

Figure 16:
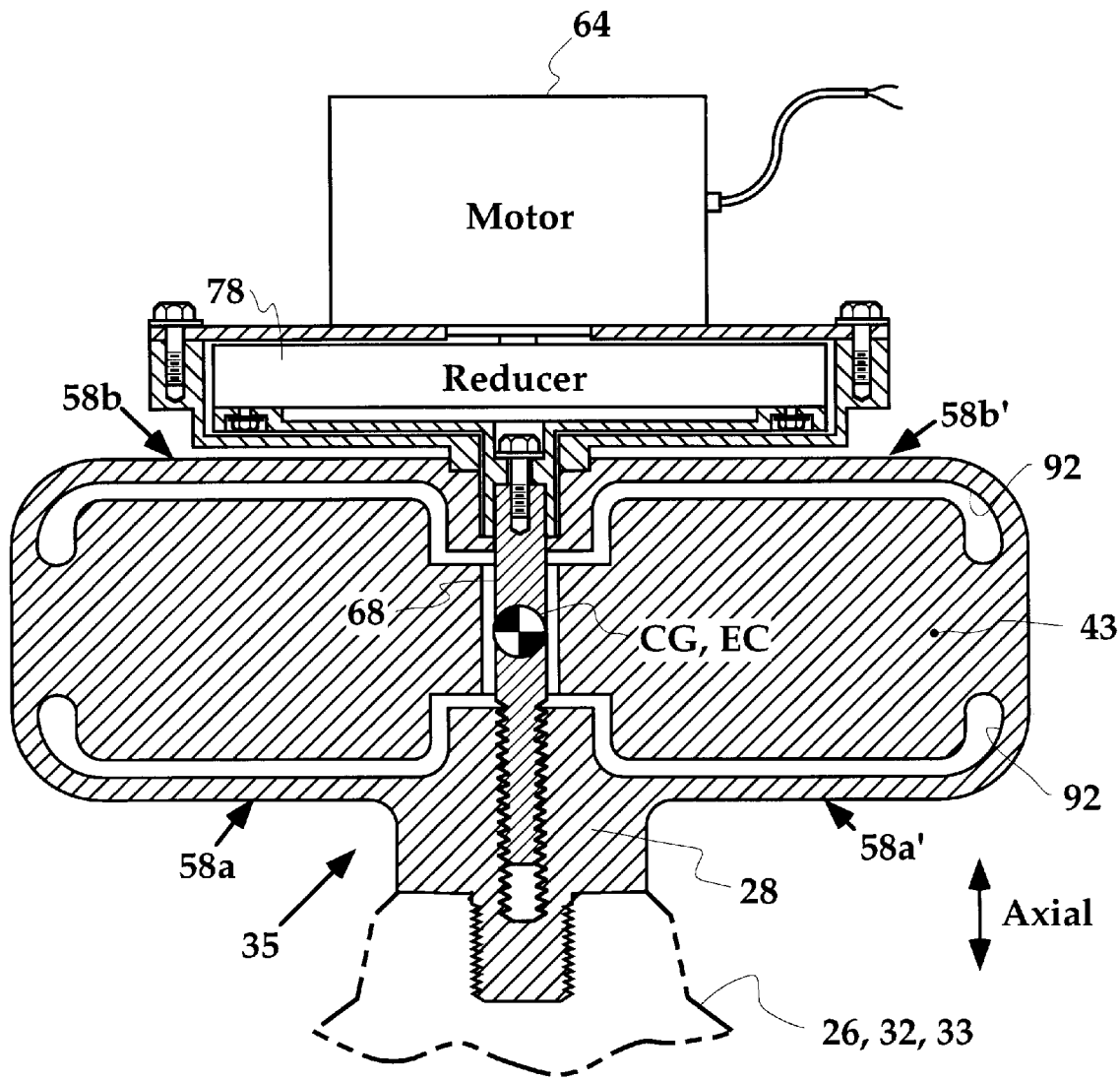
FIG. 16 is a cross sectional side view of another adaptive TVA.

FIG. 16 illustrates another embodiment of axially-acting adaptive tuned absorber 35. This embodiment includes a plurality of flexible plates 58a, 58a', 58b, 58b' flexibly suspending, integral with, and supporting a single tuned mass 43 at its outermost edge. This absorber 35 adjusts by flexure of the flexible plates 58a, 58a', 58b, 58b' thereby stressing the flexible members 58a, 58a', 58b, 58b' and effecting a change in their axial stiffness. The plates 58a, 58a', 58b, 58b' could optionally be configured in an inclined relationship similar to FIG. 15. The means for flexing is provided by a motor 64 interconnected through a reducer 78 to a threaded rod 68. Rotation of the threaded rod 68 axially compresses the flexible members 58a, 58a', 58b, 58b', placing them in bending. The reducer 78 is desirable to substantially gear down the rotation of the threaded rod 68 such that the compression can be accomplished with a small motor 64. The flexible plates 58a, 58a', 58b, 58b' and tuned mass 43 are preferably formed from a single block of material and then having through cavities 92 formed therein. Preferably, the cavities 92 are formed via a wire Electrical Discharge Machining (EDM) process. Notably, the center of gravity CG and elastic center EC of this adaptive TVA 35 are coincident. This TVA is designed to operate in an axial mode only and its tuned frequency is adaptable within limits.

Figure 17:
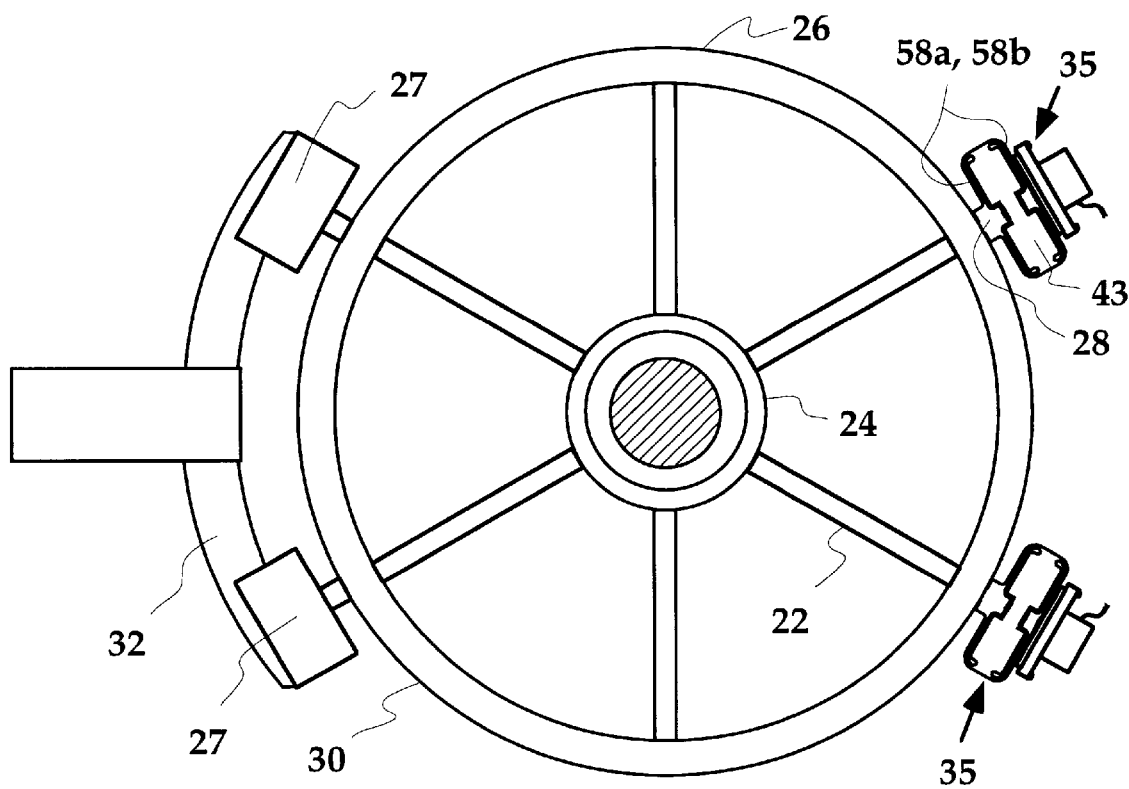
FIG. 17 is a frontal view of the adaptive TVA of FIG. 16 installed on the engine casing of a jet engine.

According to another aspect, the present invention includes a method for controlling vibration of an engine 30 at its operating frequency, said engine 30, comprising the steps of: attaching at least one adaptive tuned absorber 35 directly to said engine 30 at a location adjacent to at least one of said spokes 22, said tuned vibration absorber 35 having a base 28, at least one flexible member 58 extending from said base 28, and a tuned mass 43 suspended by said flexible member 58, and adaptively moving said tuned mass 43 relative to said base 28 to effectuate a change in a resonant frequency of said at least one tuned absorber 35 thereby tracking the engine's operating frequency. FIG. 17 illustrates an aircraft engine 30 with the axially acting TVA 35 described relative to FIG. 16 directly attached to its engine casing 26. The internal components of the engine have been removed for clarity. Preferably, one or more TVAs 35 would be attached to the engine 30 adjacent to the location of a spoke or fin-like supports 22 emanating from, and radially supporting, the bearing support housing 24 relative to the engine casing 26. From a dynamic standpoint is preferable to locate the TVAs 35 at 90° from each other about the periphery of the engine 30. However, the inventor's herein discovered that attachment of the TVAs 35 at the location of spokes 22 is more dynamically effective at reducing engine vibration because of the direct structural path gained to the bearing housing 24. Any dynamic benefit gained by attaching the TVAs at 90° from each other is lost due to the substantial compliance of the casing 26. Either hard, elastomer, or metal mesh mounts 27 are used to mount the engine 30 to the structure, such as yoke 32 and pylon 33. Preferably, the TVAs 35 are located diametrically across from the mounts 27.

Although, the method aspect of the present invention is described with reference to the TVA of FIG. 16, it should be readily apparent that the TVA of FIG. 15 could be substituted therewith. Further, any of the radial/tangential variants of FIGS. 4–14 could be implemented on the engine 30 by rotating the TVA 35 such that the axial axis is tangential or parallel to the engine casing 26. For example, the FIG. 3a attachment means bracket 45, could be used to orient the TVA 35 such that any radial vibration thereof acts towards the axis of the engine 30 thereby absorbing radial engine vibration due to engine unbalances. Also, in FIGS. 9–14, the threaded stud 56 could alternatively thread into a bracket 45 which attaches to the engine casing 26 instead of attaching to yoke 32 or pylon 33. Likewise, the devices of FIGS. 15 and 16 could be attached to the yoke 32 or pylon 33.

While the form of the apparatus and system herein described includes a preferred embodiment of this invention, it is to be understood that the invention is not limited to this precise form of apparatus and system and that changes may be made therein without departing from the scope of the invention which is defined in the appended claims.

What is claimed is:

1. A tuned vibration absorber (35) adapted for attachment to a vibrating structure (32, 33), said absorber (35) having a stiffness and tuned mass (43) defining a resonant frequency, said absorber (35) comprising:
   (a) at least one flexible plate (58) exhibiting said tuned stiffness and having an elastic center (EC),
   (b) said tuned mass (43) exhibiting a center of gravity (CG) which is offset from said elastic center (EC), said tuned mass (43) interconnected to, and suspended by, said at least one flexible plate (58),
   (c) a base (28) interconnecting said at least one flexible plate (58) to a vibrating structure (32), and
   (d) means for adaptively moving a position of said tuned mass (43) relative to said base (28) thereby changing said resonant frequency.

2. An absorber (35) of claim 1 wherein said means for adaptively moving includes a motor (64).

3. An absorber (35) of claim 2 wherein said motor (64) moves said tuned mass (43) along a rigid frame (53) interconnected to said at least one flexible plate (58).

4. An absorber (35) of claim 3 further comprising roller bearings (61) located between said tuned mass (43) and said rigid frame (53).

5. An absorber (35) of claim 4 wherein said roller bearings (61) are hollow.

6. An absorber (35) of claim 2 wherein said motor (64) is interconnected to a threaded rod (68) which threadedly engages with said tuned mass (43) whereby rotating said threaded rod (68) moves said tuned mass (43) axially.

7. An absorber (35) of claim 6 wherein the motor (64) is a stepper motor.

8. An absorber (35) of claim 6 wherein said motor (64) is mounted within a hollow (65) formed in said rigid frame (53).

9. A system (25) including an absorber (35) of claim 2 including:
   (a) a mass sensor (38) for generating a first input signal representative of a vibration of said tuned mass (43),
   (b) a base sensor (40) for generating an second input signal representative of a vibratory characteristic of said vibrating structure, and
   (c) a controller (42) for processing said first and second signals to generate a control signal to adjust said position of said tuned mass (43).

10. An absorber (35) of claim 1 for controlling vibration within a structural component of an aircraft (20), said absorber (35) being oriented such that said vibration is absorbed by a radial and/or tangential vibration of said tuned mass (43).

11. An absorber (35) of claim 1 wherein said means for adaptively moving said position of said tuned mass (43) statically deforms and stresses said at least one flexible plate (58) thereby adaptively changing said stiffness thereby changing said resonant frequency.

12. An absorber (35) of claim 11 wherein said at least one flexible plate (58) includes a first conical disc portion which when flexed changes a pivotal stiffness thereby changing said resonant frequency.

13. An absorber (35) of claim 12 further comprising a second conical disc portion cooperative with said first conical disc portion and forming a conical disc set which when flexed changes a combined pivotal stiffness of said conical disc set thereby changing said resonant frequency.

14. An absorber (35) of claim 12 wherein said means for adaptively moving a position of said tuned mass (43) moves said mass (43) further away from said base (28) and flattens out said first conical disc portion.

15. An absorber (35) of claim 12 wherein said means for statically stressing is a motor (64) interconnected to a reducer (78) which applies static axial loading thereby flexing said at least one flexible plate (58).

16. An absorber (35) of claim 15 further including a reducer (78).

17. An absorber (35) of claim 16 wherein said reducer (78) exhibits a gear reduction ratio of 80:1 or higher.

18. An absorber (35) of claim 16 wherein said reducer (78) is a harmonic drive.

19. An absorber (35) of claim 11 wherein said means for statically stressing includes a motor (64) and a rod (68) including a power thread interconnected by a reducer (78).

20. An absorber (35) of claim 19 wherein said power thread is threadedly engaged in a like threaded portion (70) in said base (28).

21. An absorber (35) of claim 19 wherein said rod (68) includes a projection (74) which is translationally restrained relative to said tuned mass (43).

22. An absorber (35) of claim 11 wherein said at least one flexible plate (58) is comprised of interconnected first and a second flexible plates (58, 58').

23. An absorber (35) of claim 11 wherein said means for statically stressing includes hydraulic pressure.

24. An absorber (35) of claim 23 wherein said hydraulic pressure acts against a piston (82) thereby applying a static axial force between said tuned mass (43) and said base (28).

25. An absorber (35) of claim 11 wherein said means for statically stressing includes pneumatic pressure.

26. An absorber (35) of claim 25 wherein said pneumatic pressure is supplied within a chamber (84) which applies a static axial force to separate said tuned mass (43) from said base (28).

27. An absorber (35) of claim 11 wherein said flex plate (58) is circular disc shaped.

28. A tuned vibration absorber (35) including a tuned mass (43), a stiffness, and a resonant frequency, comprising:
   (a) a base (28),
   (b) a rigid frame (53),
   (c) a flexible plate (58) interconnecting between said base (28) and said rigid frame (53), said flexible plate (58) substantially providing said stiffness,
   (d) a tuned mass (43) slideable on said rigid frame (53), and
   (e) means for moving said tuned mass (43) along said rigid frame (53) to effectuate a change in resonant frequency of said tuned vibration absorber (35).

29. A tuned vibration absorber (35), comprising:
   (a) a circular flexible disc (58),
   (b) a tuned mass (43) interconnecting and suspended by said flexible disc (58), and
   (c) means for statically and elastically deforming said flexible disc (58) to effectuate a change in stiffness thereby adjusting a resonant frequency of said absorber (35).

30. A tuned vibration absorber (35) of claim 29 wherein said means for statically deforming said flexible disc (58) includes a reducer (78).

31. A tuned vibration absorber (35) of claim 29 further including means for coupling to said reducer (78) whereby energizing said motor (64) causes said tuned mass (43) to adaptively move relative to said base (28).

32. A tuned vibration absorber (35) of claim 29 wherein said means for statically deforming said flexible disc (58) includes a motor (64), a reducer (78) interconnected to said motor (64), and a threaded rod (68) interconnected to said reducer (78) which threadedly engages said base (28) whereby energizing said motor (64) rotates said rod (68) thereby moving a position of said tuned mass (43) relative to said base (28).

33. A tuned vibration absorber (35) of claim 29 wherein said tuned mass (43) is generally annular-shaped and secured to said flexible disc (58) at its outermost periphery.

34. A tuned vibration absorber (35) of claim 29 wherein said flexible disc (58) includes a conical disc shaped portion which when deformed changes said stiffness of said a flexible disc (58) thereby changing a natural frequency of said tuned absorber (35).

35. A tuned vibration absorber (35) of claim 29 wherein an Elastic Center (EC) of said circular flexible disc (58) is offset from a Center of Gravity (CG) of said tuned mass (43).

36. A tuned vibration absorber (35), comprising:
   (a) a base (28),
   (b) a flexible plate (58) extending from said base (28),
   (c) a tuned mass (43) suspended by said flexible plate (58),
   (d) a motor (64),
   (e) a reducer (78) interconnecting to said motor (64), and
   (f) means for coupling to said reducer (78) whereby energizing said motor (64) causes said tuned mass (43) to adaptively move relative to said base (28) stressing said flexible plate.

37. A method for controlling vibration of an engine (30) at its operating frequency, said engine (30) having a plurality of spokes (22) providing radial support between a bearing housing (24) and a casing (26) of said engine (30), comprising the steps of:
   a) attaching at least one adaptive tuned absorber (35) directly to said engine (30) at a location adjacent to at least one of said spokes (22), said tuned vibration absorber (35) having a base (28), at least one flexible member extending from said base (28), and a tuned mass (43) suspended by said flexible member,
   b) moving said tuned mass (43) relative to said base (28) to effectuate a change in a resonant frequency of said at least one tuned absorber (35) which tracks said engine operating frequency.

38. A method for controlling vibration of an engine (30) of claim 37 including the further steps of:
   (d) attaching a motor (64) to said at least one tuned absorber (35),
   (e) interconnecting a reducer (78) to said motor (64), and (f) coupling to said reducer (78) to said base (28) whereby energizing said motor (64) causes said tuned mass (43) to adaptively move relative to said base (28) elastically stressing and deforming said flexible plate.

39. A method for controlling vibration of an engine (30) of claim 37 including the further steps of:
   (a) providing at least one flexible disc as least one flexible member (58),
   (b) interconnecting said tuned mass (43) by said flexible disc, and
   (c) statically stressing said flexible disc responsive said adaptively moving said tuned mass (43) to effectuate a change in axial stiffness.

40. A method for controlling vibration of an engine (30) of claim 37 including the further steps of:
   a) attaching said flexible member to a rigid frame (53), said flexible member being a flexible plate (58),
   b) sliding said tuned mass (43) on said rigid frame (53).

\* \* \* \* \*